US012614470B2

(12) United States Patent
Umematsu et al.

(10) Patent No.: US 12,614,470 B2
(45) Date of Patent: *Apr. 28, 2026

(54) INFORMATION PROCESSING DEVICE, DETERMINATION METHOD, AND STORAGE MEDIUM FOR DETERMINING AN APPROACH BASED ON TASK EVALUATION

(71) Applicant: NEC Corporation, Tokyo (JP)

(72) Inventors: Terumi Umematsu, Tokyo (JP); Yoshifumi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 18/423,870

(22) Filed: Jan. 26, 2024

(65) Prior Publication Data

US 2024/0232780 A1     Jul. 11, 2024

Related U.S. Application Data

(63) Continuation of application No. 18/289,767, filed as application No. PCT/JP2022/043973 on Nov. 29, 2022.

(51) Int. Cl.
*G09B 7/02*         (2006.01)
*G06Q 10/0631*    (2023.01)
(Continued)

(52) U.S. Cl.
CPC ......... *G09B 7/02* (2013.01); *G06Q 10/06316* (2013.01); *G06Q 10/06398* (2013.01); *G06V 40/174* (2022.01)

(58) Field of Classification Search
CPC .......... G06Q 10/00–50/00; G09B 1/00–29/00; G06V 10/00–40/00
(Continued)

(56) References Cited

U.S. PATENT DOCUMENTS

| 10,115,038 B2 * | 10/2018 | Hazur | ...................... G09B 7/08 |
| 2008/0038705 A1 * | 2/2008 | Kerns | ...................... G09B 7/08 434/327 |

(Continued)

FOREIGN PATENT DOCUMENTS

| CN | 112053269 A | 12/2020 |
| CN | 113158859 A | 7/2021 |

(Continued)

OTHER PUBLICATIONS

US Office Action for U.S. Appl. No. 18/289,767, mailed on May 20, 2025.

(Continued)

*Primary Examiner* — Alan S Miller
(74) *Attorney, Agent, or Firm* — Sughrue Mion, PLLC

(57)     ABSTRACT

An information processing device 1X mainly includes an acquisition means 15X, an estimation means 16X, and a determination means 17X. The acquisition means 15X acquires task evaluation information relating to evaluation of execution of a task executed by a subject. The estimation means 16X estimates a state of the subject in execution of the task. The determination means 17X determines a mode of an approach to the subject based on the task evaluation information and the state of the subject. The device can support decision making regarding intervention in a subject's task execution.

11 Claims, 15 Drawing Sheets

(51) Int. Cl.
  *G06Q 10/0639* (2023.01)
  *G06V 40/16* (2022.01)

(58) Field of Classification Search
  USPC ............................................... 705/7.11–7.42
  See application file for complete search history.

(56) References Cited

U.S. PATENT DOCUMENTS

| | | | | |
|---|---|---|---|---|
| 2009/0312998 | A1* | 12/2009 | Berckmans | G16H 50/50 |
| | | | | 703/11 |
| 2014/0098092 | A1* | 4/2014 | Isokawa | G06T 15/503 |
| | | | | 345/419 |
| 2014/0172426 | A1 | 6/2014 | Aratsu et al. | |
| 2014/0351191 | A1* | 11/2014 | Kon | G06N 5/04 |
| | | | | 706/45 |
| 2015/0099255 | A1* | 4/2015 | Aslan | H04L 67/30 |
| | | | | 434/350 |
| 2016/0104385 | A1 | 4/2016 | Alam et al. | |
| 2016/0203726 | A1* | 7/2016 | Hibbs | A61B 5/165 |
| | | | | 434/308 |
| 2018/0018540 | A1* | 1/2018 | Hazur | G09B 7/04 |
| 2018/0293528 | A1* | 10/2018 | Bostick | G06Q 10/06316 |
| 2019/0159716 | A1* | 5/2019 | Alailima | A61B 5/165 |
| 2020/0364724 | A1* | 11/2020 | Pulugurtha | G06Q 30/016 |
| 2020/0380882 | A1* | 12/2020 | Alailima | A61B 5/4836 |
| 2022/0051670 | A1 | 2/2022 | Tabata et al. | |
| 2022/0315010 | A1* | 10/2022 | Watanabe | A61B 5/14551 |
| 2023/0026929 | A1* | 1/2023 | Ebihara | G06V 20/52 |

FOREIGN PATENT DOCUMENTS

| | | |
|---|---|---|
| CN | 113486744 A | 10/2021 |
| JP | 2012-252435 A | 12/2012 |
| JP | 2014-228725 A | 12/2014 |
| JP | 2016-118575 A | 6/2016 |
| JP | 2021-108046 A | 7/2021 |
| JP | 2022-082547 A | 6/2022 |
| WO | 2021/131954 A1 | 7/2021 |
| WO | 2022/158160 A1 | 7/2022 |

OTHER PUBLICATIONS

International Search Report for PCT Application No. PCT/JP2022/043973, mailed on Feb. 21, 2023.
US Notice of Allowance for U.S. Appl. No. 18/289,767, mailed on Oct. 29, 2025.

* cited by examiner

| ACCURACY RATE / DEGREE OF CONCENTRATION | HIGH | MIDDLE | LOW |
|---|---|---|---|
| HIGH | INCREASE DIFFICULTY LEVEL 1 | DECREASE DIFFICULTY OR PROMPT REVIEW LEVEL 1 | DECREASE DIFFICULTY OR PROMPT REVIEW LEVEL 2 |
| MIDDLE | INCREASE DIFFICULTY LEVEL 2 | NORMAL HANDLING | RECESS OR TRY AGAIN LEVEL 1 |
| LOW | INCREASE DIFFICULTY LEVEL 3 | RECESS OR TRY AGAIN LEVEL 1 | RECESS OR TRY AGAIN LEVEL 2 |

FIG. 5B

| ACCURACY RATE / DEGREE OF AROUSAL | HIGH | MIDDLE | LOW |
|---|---|---|---|
| HIGH | INCREASE DIFFICULTY LEVEL 1 | DECREASE DIFFICULTY OR PROMPT REVIEW LEVEL 1 | DECREASE DIFFICULTY OR PROMPT REVIEW LEVEL 2 |
| MIDDLE | INCREASE DIFFICULTY LEVEL 2 | NORMAL HANDLING | RECESS OR TRY AGAIN LEVEL 1 |
| LOW | INCREASE DIFFICULTY LEVEL 3 | RECESS OR TRY AGAIN LEVEL 1 | RECESS OR TRY AGAIN LEVEL 2 |

FIG. 5C

| ACCURACY RATE / TENSION LEVEL | HIGH | MIDDLE | LOW |
|---|---|---|---|
| HIGH | INCREASE DIFFICULTY LEVEL 3 | RECESS OR TRY AGAIN LEVEL 1 | RECESS OR TRY AGAIN LEVEL 2 |
| MIDDLE | INCREASE DIFFICULTY LEVEL 2 | NORMAL HANDLING | RECESS OR TRY AGAIN LEVEL 1 |
| LOW | INCREASE DIFFICULTY LEVEL 1 | DECREASE DIFFICULTY OR PROMPT REVIEW LEVEL 1 | DECREASE DIFFICULTY OR PROMPT REVIEW LEVEL 2 |

31

TEST
RESULT

85

15 HIGHER
THAN AVERAGE

32

MENTAL STATE DURING TEST

| DEGREE OF CONCENTRATION | DEGREE OF AROUSAL | TENSION LEVEL |
|---|---|---|
| 90 | 85 | 70 |

33

YOU OBTAINED GOOD RESULT AT CURRENT DIFFICULTY.
A LITTLE MORE DIFFICULT TEST WILL BE CONDUCTED.

34

START TEST

FIG. 11A

| ACCURACY RATE / DEGREE OF AROUSAL | HIGH | MIDDLE | LOW |
|---|---|---|---|
| HIGH | RELIABILITY SCORE 8 | RELIABILITY SCORE 8 | RELIABILITY SCORE 8 |
| MIDDLE | RELIABILITY SCORE 5 | RELIABILITY SCORE 5 | RELIABILITY SCORE 5 |
| LOW | RELIABILITY SCORE 2 | RELIABILITY SCORE 2 | RELIABILITY SCORE 2 |

FIG. 11B

| DEGREE OF CONCENTRATION / DEGREE OF AROUSAL | HIGH | MIDDLE | LOW |
|---|---|---|---|
| HIGH | RELIABILITY SCORE 9 | RELIABILITY SCORE 7 | RELIABILITY SCORE 7 |
| MIDDLE | RELIABILITY SCORE 8 | RELIABILITY SCORE 6 | RELIABILITY SCORE 2 |
| LOW | RELIABILITY SCORE 3 | RELIABILITY SCORE 2 | RELIABILITY SCORE 1 |

100A

INFORMATION PROCESSING DEVICE, DETERMINATION METHOD, AND STORAGE MEDIUM FOR DETERMINING AN APPROACH BASED ON TASK EVALUATION

This application is a continuation application of U.S. application Ser. No. 18/289,767, filed on Nov. 7, 2023, which is a National Stage Entry of PCT/JP2022/043973 filed on Nov. 29, 2022, the contents of all of which are incorporated herein by reference, in their entirety.

TECHNICAL FIELD

The present disclosure relates to the technical field of an information processing device, a determination method, and storage medium for determining an approach to the execution of a task.

BACKGROUND

There are known devices or systems for determining the appropriateness of a task performed by a subject. For example, Patent Literature 1 discloses a work appropriateness determination system configured to determine the degree of work appropriateness by observing a variation in workload and a variation in biological information and thereby in real time estimating the stress due to the work at the present time.

CITATION LIST

Patent Literature

Patent Literature 1: JP 2022-82547A

SUMMARY

Problem to be Solved

In such a case where a subject executes tasks continuously or intermittently, it is possible to facilitate the subject's efficient task performance by an appropriate approach from the system to the subject at each completion timing of the task. In contrast, the mode of such an approach needs to be appropriately determined according to the state of the subject and the task execution situation.

In view of the above-described issue, it is therefore an example object of the present disclosure to provide an information processing device, a determination method, and a storage medium capable of accurately determining a mode of an approach to a subject regarding execution of a task.

Means for Solving the Problem

In one mode of the information processing device, there is provided an information processing device including:

an acquisition means configured to acquire task evaluation information relating to evaluation of execution of a task executed by a subject;

an estimation means configured to estimate a state of the subject in execution of the task; and a determination means configured to determine a mode of an approach to the subject based on the task evaluation information and the estimated state of the subject.

In one mode of the determination method, there is provided a determination method executed by a computer, the determination method including:

acquiring task evaluation information relating to evaluation of execution of a task executed by a subject;

estimating a state of the subject in execution of the task; and determining a mode of an approach to the subject based on the task evaluation information and the estimated state of the subject.

In one mode of the storage medium, there is provided a storage medium storing a program executed by a computer, the program causing the computer to acquire task evaluation information relating to evaluation of execution of a task executed by a subject;

estimate a state of the subject in execution of the task; and determine a mode of an approach to the subject based on the task evaluation information and the estimated state of the subject.

Effect

An example advantage according to the present invention is to accurately determine the mode of an approach to a subject regarding execution of a task.

BRIEF DESCRIPTION OF THE DRAWINGS

FIG. 5A is a table indicative of the correspondence among the degree of concentration and the accuracy rate and the intervention mode, in the case of determining the intervention mode on the basis of the accuracy rate that is an example of the evaluation index regarding the execution of the task indicated by task evaluation information and the degree of concentration that is an example of the state index.

FIG. 5B is a table showing a correspondence among the degree of arousal and accuracy rate and intervention mode in the case of determining the intervention mode based on the degree of arousal, which is an example of the state index, and accuracy rate.

FIG. 5C is a table showing the correspondence among the tension level and the accuracy rate and the intervention mode in the case of determining the intervention mode based on the tension level, which is an example of the state index, and the accuracy rate.

FIG. 11A is a table showing the correspondence relation between: a set of the degree of arousal, which is an example of a state index, and the accuracy rate, which is an example of an evaluation index related to execution of the task; and the corresponding reliability score.

FIG. 11B a table showing the correspondence relation between: a set of the degree of arousal and concentration level; and the corresponding reliability score.

EXAMPLE EMBODIMENTS

Hereinafter, example embodiments of an information processing device, a determination method, and a storage medium will be described with reference to the drawings.

First Example Embodiment (1) System Configuration

Figure 1:
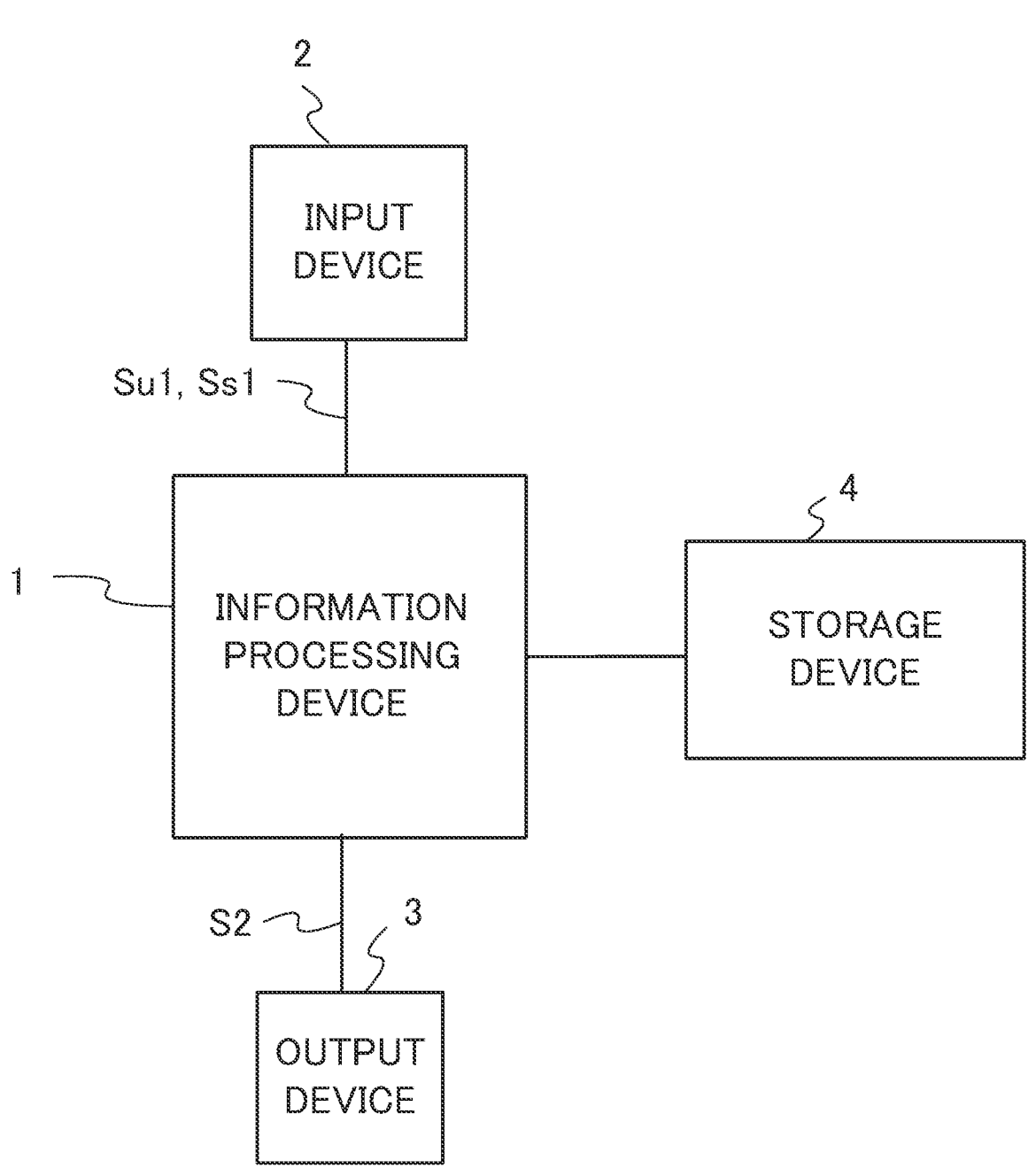
FIG. 1 It shows a schematic configuration of a task evaluation and intervention system in the first example embodiment.

FIG. 1 shows a schematic configuration of a task evaluation/intervention system 100 according to a first example embodiment. In such a case where a subject executes a plurality of tasks continuously or intermittently in order, the task evaluation/intervention system 100 performs an evaluation regarding the execution of each individual task and an approach (intervention) to the subject based on the evaluation. This encourages the subject to perform more effective implementation of tasks and improve the handling of tasks in accordance with the individual.

The term "task" herein indicates a work to be performed by a subject, and examples of the task include a test for measuring a predetermined function, capability, skill, or the like of the subject, a learning such as an e-Learning for improving a predetermined function, a training such as such as a game (so-called brain tree) for training the brain. For example, the above-described test, learning, and training may be a test, learning and training relating to at least one of categories of intelligence (e.g., language understanding, perceptual integration, working memory, processing speed), an attention function, a frontal leaf function, language, memory, visual space cognition, and directed attention.

The task evaluation/intervention system 100 mainly includes an information processing device 1, an input device 2, an output device 3, and a storage device 4. The information processing device 1 performs data communication with the input device 2 and the output device 3 via a communication network or by wireless or wired direct communication.

The information processing device 1 determines an evaluation of execution of the task executed by the subject and a mode (also referred to as "intervention mode") of an approach to the subject based on the evaluation, based on the input signal supplied from the input device 2 and information stored in the storage device 4. The information processing device 1 generates an output signal "S2" based on the determined evaluation regarding the execution of the task and the determined intervention mode and supplies the generated output signal S2 to the output device 3.

The input device 2 generates an input signal based on the operation by the subject or the measurement result of the subject. The input device 2 includes one or more user input interfaces that receives an operation (external input) by the subject and one or more sensors that perform observation (sensing) of the subject. Examples of the user input interfaces include a touch panel, a button, a keyboard, a mouse, and a voice input device. Examples of the sensors include a camera, a lidar, and a measuring instrument for measuring a biological signal (including vital information). Hereafter, the input signal outputted by the user input interfaces for subject's operation is referred to as "user input signal Su1", and the input signal outputted by the sensors which observes the subject is referred to as "observation input signal Ss1". The input device 2 may be a wearable terminal worn by the subject, may be a camera for photographing the subject or a microphone for generating a voice signal of utterance of the subject, or may be a terminal such as a personal computer or a smartphone operated by the subject.

The output device 3 displays or outputs information or the like based on the intervention mode determined by the information processing device 1 based on the output signal S2 supplied from the information processing device 1. The term "user" herein may indicate the subject itself, or may indicate a person (doctor, caretaker, supervisor, etc.) who manages or supervises the activity of the subject. Examples of the output device 3 include a display, a projector, and a speaker.

The storage device 4 is one or more memories for storing various information necessary for processing performed by the information processing device 1. For example, the storage device 4 includes information regarding each task that the subject may perform. Examples of the information regarding the task include display information and sound information to be outputted by the output device 3 when the task is executed by the subject, information for evaluating the execution result of the task (e.g., correct answer information for each question), and information regarding the difficulty level of the task. The storage device 4 also includes information necessary for estimating a state (condition) of the subject, and information necessary for determining the intervention mode based on the evaluation of the execution of the task. The storage device 4 may be an external storage device, such as a hard disk, connected to or embedded in the information processing device 1, or may be a storage medium, such as a flash memory. The storage device 4 may be a server device that performs data communication with the information processing device 1. Further, the storage device 4 may be configured by a plurality of devices.

The configuration of the task evaluation/intervention system 100 shown in FIG. 1 is an example, and various changes may be made to the configuration. For example, the input device 2 and the output device 3 may be configured integrally. In this case, the input device 2 and the output device 3 may be configured as a tablet type terminal that is integrated with or separate from the information processing device 1. Further, the information processing device 1 may be configured by a plurality of devices. In this case, the plurality of devices constituting the information processing device 1 performs transmission and reception of information necessary for executing preassigned processing among the plurality of devices. In this case, the information processing device 1 functions as a system.

(2) Hardware Configuration

Figure 2:
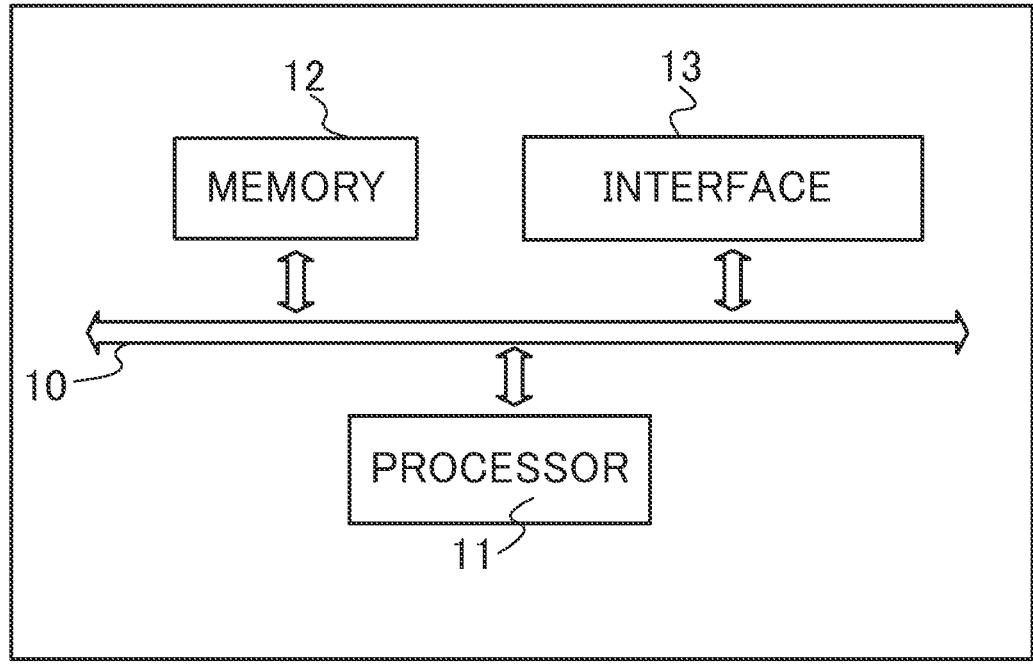
FIG. 2 It shows the hardware configuration of the information processing device common to each example embodiment.

FIG. 2 shows a hardware configuration of the information processing device 1. The information processing device 1 includes a processor 11, a memory 12, and an interface 13 as hardware. The processor 11, the memory 12 and the interface 13 are connected to one another via a data bus 10.

The processor 11 functions as a controller (arithmetic unit) which controls the entire information processing device 1 by executing a program stored in the memory 12. Examples of the processor 11 include a CPU (Central Processing Unit), a GPU (Graphics Processing Unit), and a TPU (Tensor Processing Unit). The processor 11 may be configured by a plurality of processors. The processor 11 is an example of a computer.

The memory 12 includes a variety of volatile and nonvolatile memories, such as a RAM (Random Access Memory), a ROM (Read Only Memory), and a flash memory. Further, a program for executing a process executed by the information processing device 1 is stored in the memory 12. A part of the information stored in the memory 12 may be stored in one or more external storage devices that can communicate with the information processing device 1, or may be stored in a removable storage medium detachable from the information processing device 1.

The interface 13 is one or more interfaces for electrically connecting the information processing device 1 to other devices. Examples of these interfaces include a wireless interface, such as a network adapter, for transmitting and receiving data to and from other devices wirelessly, and a hardware interface, such as a cable, for connecting to other devices.

The hardware configuration of the information processing device 1 is not limited to the configuration shown in FIG. 2. For example, the information processing device 1 may include at least one of the input device 2 and/or the output device 3. Further, the information processing device 1 may be connected to or incorporate a sound output device such as a speaker.

(3) Functional Blocks

Figure 3:
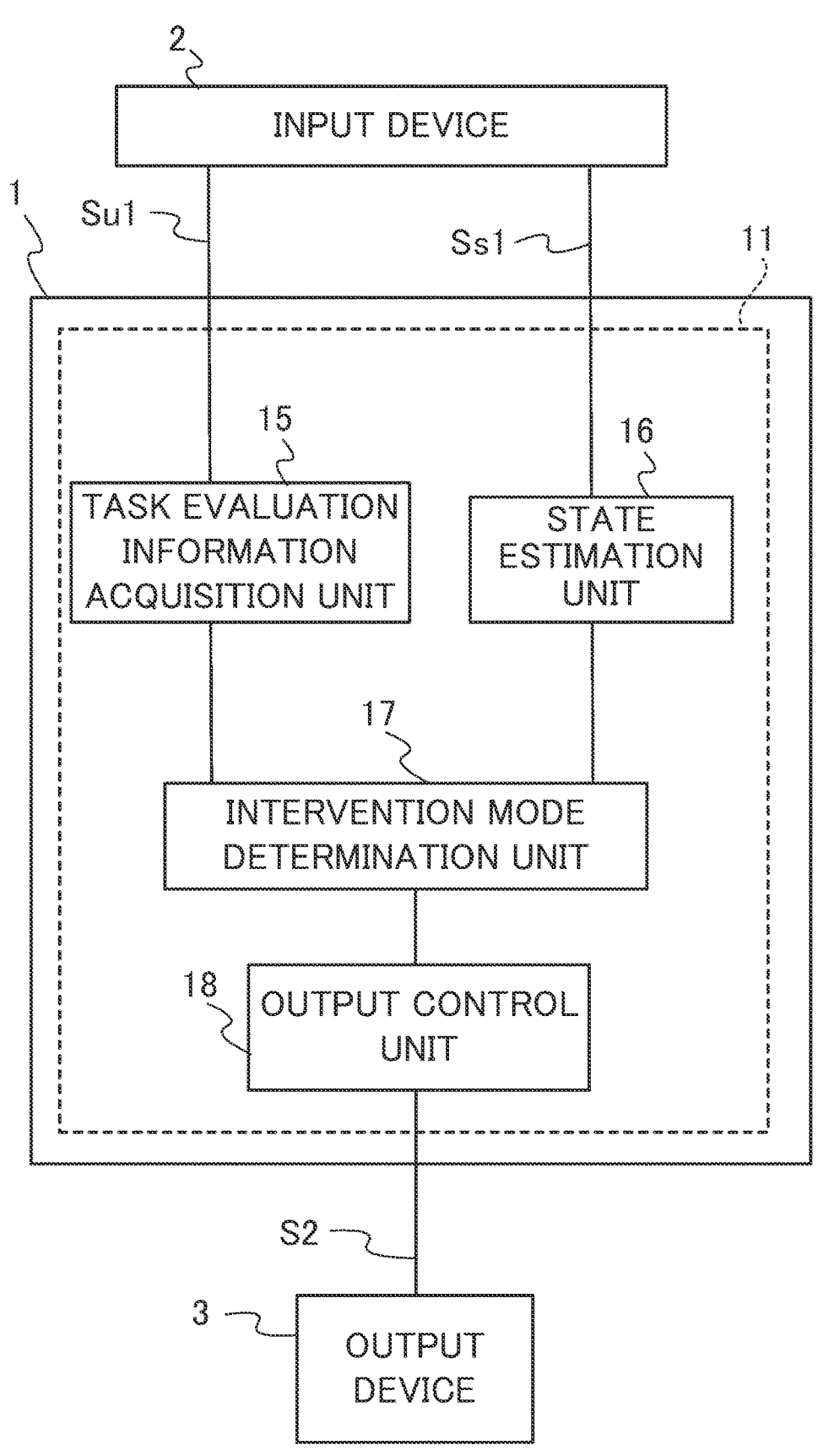
FIG. 3 It is an example of a functional block diagram of the information processing device in the first example embodiment.

FIG. 3 is an example of functional blocks of the information processing device 1. The processor 11 of the information processing device 1 functionally includes a task evaluation information acquisition unit 15, a state estimation unit 16, an intervention mode determination unit 17, and an output control unit 18. In FIG. 3, blocks to exchange data with each other are connected by a solid line, but the combination of blocks to exchange data with each other is not limited thereto. The same applies to the drawings of other functional blocks described below.

The task evaluation information acquisition unit 15 receives the user input signal Su1 generated by the input device 2 during the execution of the task by the subject through the interface 13, and generates task evaluation information indicating the evaluation of the execution of the task by the subject based on the user input signal Su1. The task evaluation information includes a calculated value of an index (also referred to as "task evaluation index") indicative of an evaluation (e.g., an evaluation indicating whether or not the task is successfully completed) of the execution of the task. If the task is a test, the task evaluation index indicates the accuracy rate or the total score of the test including all questions in the test taken by the subject. If the task is learning or training, the task evaluation index indicates the accuracy rate or the score regarding the questions for learning check included in the learning or training taken by the subject. The task evaluation information may include not only the calculated value of the task evaluation index, but also information regarding the start time of the task execution, the completion time of the task execution, the time (required time) required to execute the task, and the difficulty level of the executed task. The task evaluation information acquisition unit 15 supplies the generated task evaluation information to the intervention mode determination unit 17.

The state estimation unit 16 receives through the interface 13 the observation input signal Ss1 generated by the input device 2 such as a sensor that measures the subject while the task is being performed by the subject, and estimates the state of the subject based on the observation input signal Ss1. Then, the state estimation unit 16 supplies information (also referred to as "subject state information") indicating the estimated state of the subject to the intervention mode determination unit 17.

In this case, the state estimation unit 16 calculates an estimated value of an index (also referred to as "state index") representing the state of the subject. Examples of "state index" include the degree of concentration, the degree of arousal, and the tension level. In this instance, the observation input signal Ss1 includes, for example, facial images obtained in time series by photographing the face of the subject, and the state estimation unit 16 calculates an estimated value of the state index based on the facial images. The state estimation unit 16 supplies the calculated estimated value of the state index to the intervention mode determination unit 17. The observation input signal Ss1 used for the state estimation unit 16 to calculate the estimated value of the state index is not limited to the facial images, and may be various types of information such as a voice signal of the subject, a biological signal, and any other information available for state estimation of a person. The state estimation unit 16 may calculate the estimated value of the state index by using the observation input signals Ss1 obtained during the whole time period (task execution period) in which the task to be evaluated is being executed, or may calculate the estimated value of the state index by using the observation input signals Ss1 obtained during a part of the task execution period. In addition, when plural estimated values of the state index at plural times during the task execution period are calculated, the state estimation unit 16 may calculate the representative value thereof such as the average value of the estimated values in the task execution period for each state index. Then, the state estimation unit 16 supplies the subject state information indicating the estimated value of the state index in the task execution period to the intervention mode determination unit 17.

In addition, the storage device 4 may store learned parameters of a state estimation model that is trained to output an estimated value of the state index when data (e.g., time series data of the above-described facial images) based on the observation input signal Ss1 is inputted thereto. The state estimation model is, for example, a model based on any machine learning (including a statistical model, hereinafter the same) such as a neural network and a support vector machine. In this case, the state estimation unit 16 builds the state estimation model based on the parameters, and acquires an estimate value of the state index outputted by the state estimation model in response to input of data in a predetermined tensor format such as a facial image to the state estimation model. In addition, when the above-described state estimation model is a model based on a neural network such as a convolution neural network, the storage device 4 stores information regarding various parameters such as a layer structure, a neuron structure of each layer, the number of filters and a filter size in each layer, and a weight for each element of each filter in advance.

The intervention mode determination unit 17 determines the mode (that is, the intervention mode) of the approach to the subject, based on the task evaluation information supplied from the task evaluation information acquisition unit 15 and the subject state information supplied from the state estimation unit 16. In this case, for example, the intervention mode determination unit 17 determines the above-described intervention mode, based on calculated values of one or more evaluation indices indicated by the task evaluation information and estimated values of one or more state indices indicated by the subject state information. In this case, for example, the intervention mode determination unit 17 determines the above-mentioned intervention mode with reference to a predetermined table indicative of correspondence relation among the calculation value of the task evaluation index, the estimated value of the state index, and the intervention mode to be executed. The table described above, for example, is previously stored in the storage device 4. In this case, for example, the intervention mode determination unit 17 determines a mode of the approach relating to the subsequent task to be worked on next by the subject. In another example, the intervention mode determination unit 17 determines the mode of the approach relating to a change in the state of the mind and body of the subject. The method of determining the intervention mode by the intervention mode determination unit 17 will be described later. Then, the intervention mode determination unit 17 supplies information (also referred to as "intervention mode designation information") specifying the determined intervention mode to the output control unit 18.

Based on the intervention mode designation information supplied from the intervention mode determination unit 17, the output control unit 18 performs a control of outputting information based on the intervention mode determined by the intervention mode determination unit 17. In this case, for example, the output control unit 18 transmits to the output device 3 an output signal S2 relating to the display or/and the voice output for causing the subject to subsequently perform another task whose difficulty level is lower or higher than the previously performed task, or, another task whose type is different from the previously performed task, based on the intervention mode designation information. In another example, the output control unit 18 transmits to the output device 3 an output signal S2 relating to the display/voice output for prompting the changes in the mental and/or physical state, based on the intervention mode designation information. Examples of the "promoting the changes in the mental and/or physical state" may include notifying the user of the timing to end a task and providing a notification prompting a recession.

The output control unit 18 may further receive the task evaluation information or the like from the task evaluation information acquisition unit 15 and generate an output signal S2 including information regarding the execution result of the task. Similarly, the output control unit 18 may receive the subject state information from the state estimation unit 16 and generate an output signal S2 including information regarding the estimated state of the subject in the middle of performing the task. A specific example of the output control of the output device 3 by the output control unit 18 will be described later with reference to FIG. 6 and the like.

Here, for example, each component of the task evaluation information acquisition unit 15, the state estimation unit 16, the intervention mode determination unit 17 and the output control unit 18 described in FIG. 3 can be realized by the processor 11 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce), ASIC (Application Specific Integrated Circuit) and/or a quantum processor (quantum computer control chip). In this way, each component may be implemented by a variety of hardware. The above is true for other example embodiments to be described later. Further, each of these components may be realized by the collaboration of a plurality of computers, for example, using cloud computing technology.

(4) Concrete Example of State Estimation

Figure 4:
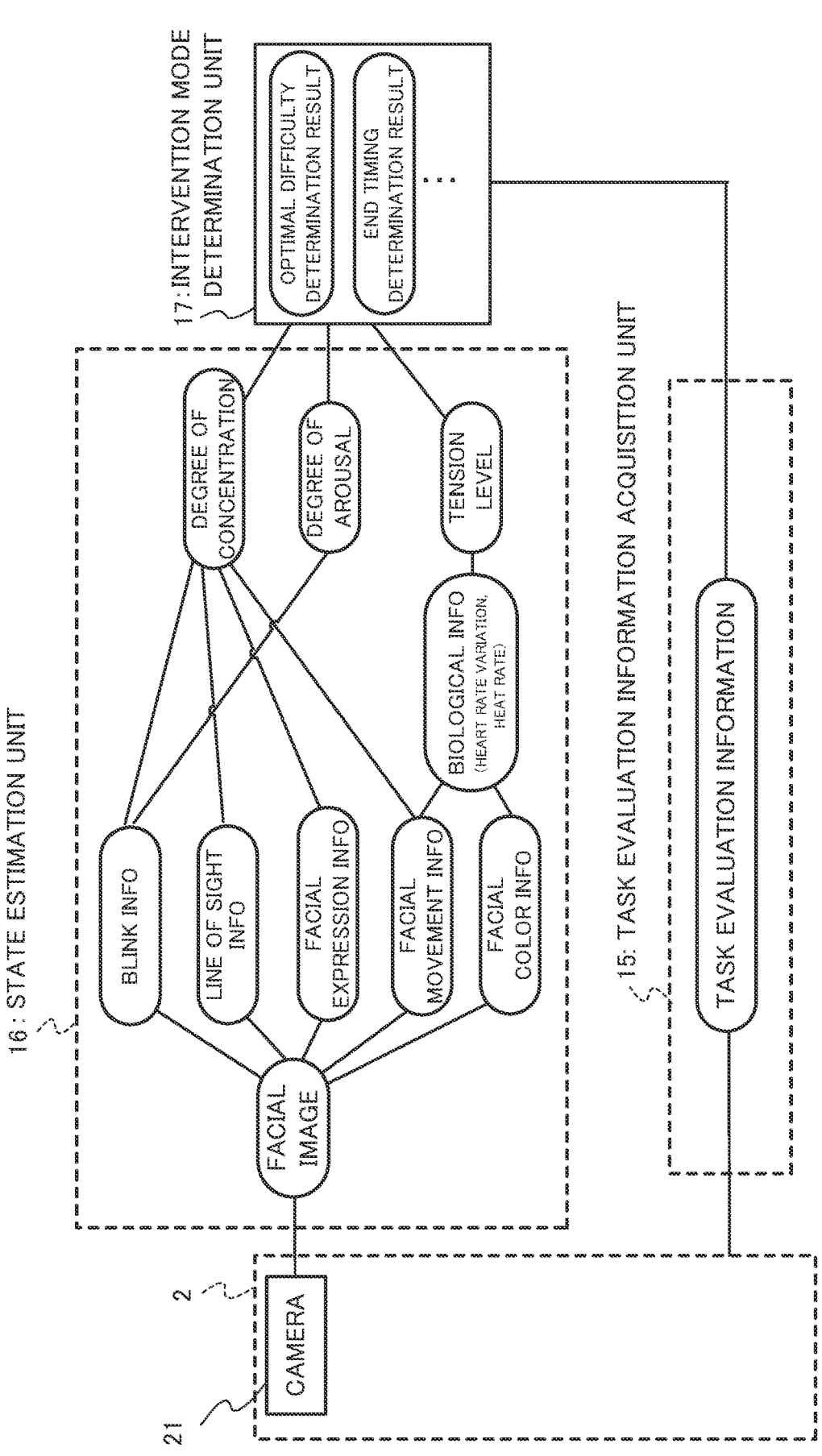
FIG. 4 It is a block diagram in a case of performing the state estimation of the subject based on a facial image.

Next, a specific example of the state estimation of the subject using the camera will be described. FIG. 4 is a block diagram clearly showing information generated in the task evaluation information acquisition unit 15, the state estimation unit 16, and the intervention mode determination unit 17 when the state estimation of the subject is performed based on one or more facial images outputted by the camera 21 included in the input device 2. In FIG. 4, each ellipse frame shows information (data).

In this case, the input device 2 includes a camera 21 that is a visible light camera. Examples of the camera 21 include a camera attached to a device such as a smartphone, a tablet, or a personal computer used by a subject. Then, the camera 21 generates a facial image obtained by photographing the face of the subject and supplies it to the information processing device 1. In this case, the camera 21 continuously generates the facial image and supplies it to the information processing device 1 during the period from the start of the task to the end of the task, for example.

The state estimation unit 16 of the information processing device 1 generates various information (such as blink information, line of sight information, facial expression information, facial movement information, and facial color information) regarding the state of the subject's face during the task execution, based on the facial image generated by the camera 21 using any image recognition technology. Here, the blink information is, for example, information regarding the frequency of blinking, the line of sight information is, for example, information regarding the direction of the line of sight, the facial expression information is, for example, information regarding the classification of facial expressions such as delight, anger, sorrow, and pleasure, the facial movement information is, for example, information regarding movement of each part of the face, and the face color information is, for example, information regarding the classification of the face color, the lightness or red, blue, green, and color taste. In this case, for example, the state estimation unit 16 may generate the above-described various pieces of information using a portion of eyes, a non-moving portion of a skin, or the like in the facial image. The state estimation unit 16 may generate the above-described various pieces of information based on an inference engine which is trained to output, in response to input of a facial image thereto, above-described information relating to the state of the face shown in the inputted facial image. In this case, the learned parameters of the inference engine described above are pre-stored, for example, in the storage device 4. Further, since the camera 21 is a visible light camera, the state estimation unit 16 may estimate the heart rate based on the G channel of RGB channels of the facial image.

Furthermore, the state estimation unit 16 calculates an estimated value of the state index based on the above-described various pieces of information. Here, the state estimation unit 16 estimates the degree of concentration in execution of the task on the basis of the line of sight information, the facial expression information, and the facial movement information. The state estimation unit 16 esti-mates the degree of arousal in execution of the task based on the blink information. Furthermore, the state estimation unit 16 estimates the tension level in execution of the task based on the biological information regarding the heart rate varia-tion and the heart rate estimated from the facial movement information and the facial color information. In this case, the state estimation unit 16 may calculate the estimated value of each state index based on the above-described various pieces of information relating to the state of the face by using an inference engine, wherein the inference engine is trained to output, in response to input of above-described types of information regarding the state of the face thereto, an estimated value of each state index. In another example, the state estimation unit 16 may calculate the estimated value of each state index from various information relating to the state of the face based on a predetermined look-up table or an equation indicating the correspondence between the information relating to the state of the face and an estimated value of each state index. In this case, the learned parameters of the inference engine or the look-up tables or equation described above are pre-stored, for example, in the storage device 4. The state estimation unit 16 supplies the calculated degree of concentration, calculated degree of arousal, and calculated tension level to the intervention mode determi-nation unit 17.

It is noted that the state estimation unit 16 does not need to calculate all of the degree of concentration, the degree of arousal and the tension level, and may calculate at least one of them. Examples of the state index calculated by the state estimation unit 16 include not only the degree of concen-tration, the degree of arousal, and the tension level, but also any one or more indices relating to stress, drowsiness, concentration, tension, arousal, fatigue, discomfort, or the like.

In addition to the facial image generated by the camera 21, the state estimation unit 16 may calculate each state index by using any information such as a voice signal representing the utterance content of the subject recorded in execution of the task, and biological information regarding the subject directly or indirectly measured from the subject in execution of the task. Examples of "indirectly measured" include a case in which the heart rate or breathing of the subject is measured by reflection of radio waves without any contact.

Based on the degree of concentration, the degree of arousal, and the tension level supplied from the state esti-mation unit 16 and the task evaluation information supplied from the task evaluation information acquisition unit 15, the intervention mode determination unit 17 determines the optimized degree of difficulty of the task to be executed by the subject, and determines the timing (time of ending) of ending the learning if the task is learning. Then, the inter-vention mode determination unit 17 generates the determi-nation result (optimized difficulty determination result) regarding the optimized degree of difficulty of the task to be executed by the subject, and the determination result (end timing determination result) regarding the timing of ending the learning, and then supplies the generated determination result to the output control unit 18. Thus, the output control unit 18 can suitably determine the mode of the approach related to task execution of the subject, based on the state of the subject and evaluation of the task execution result.

(5) Specific Examples of Intervention Mode Determination

Next, a description will be given of specific examples of the determination of the intervention mode to be executed by the intervention mode determination unit 17.

FIG. 5A is a table indicative of the correspondence among the degree of concentration and the accuracy rate and the intervention mode, in the case of determining the interven-tion mode on the basis of the accuracy rate that is an example of the evaluation index regarding the execution of the task indicated by task evaluation information and the degree of concentration that is an example of the state index. FIG. 5B is a table showing a correspondence among the degree of arousal and accuracy rate and intervention mode in the case of determining the intervention mode based on the degree of arousal, which is an example of the state index, and accuracy rate. FIG. 5C is a table showing the correspondence among the tension level and the accuracy rate and the intervention mode in the case of determining the intervention mode based on the tension level, which is an example of the state index, and the accuracy rate. In FIG. 5A to FIG. 5C, the type and degree of approach are shown as an intervention mode, and the degree on a scale of level 1 to level 3 (level 3 is the highest degree) is shown as an example. Further, in FIGS. 5A to 5C, each state index value, as an example, is classified into a level selected from low, medium, and high. In addition, "normal handling" is equivalent to the case where no intervention is performed. For example, it indicates a handling to proceed with the next task as scheduled without changing the task difficulty level.

In the example shown in FIG. 5A, if the degree of concentration is high but the evaluation of the task execution is low (i.e., if the degree of concentration is "high" and the accuracy rate is "low", or if the degree of concentration is "high" and the accuracy rate is "medium"), the intervention mode determination unit 17 decreases the degree of diffi-culty of the next task or selects an intervention mode that prompts the review of the task performed immediately before. Here, the degree of intervention in the case of "high" concentration and "low" accuracy rate is one step higher than that in the case of "high" concentration and "medium" accuracy rate. Thus, for example, the intervention mode determination unit 17 sets the degree of decreasing the difficulty of the task in the case of "high" concentration and "low" accuracy rate to be higher than that in the case of "high" concentration and "medium" accuracy rate. In another example, the intervention mode determination unit 17 sets the degree of prompting the review in the case of "high" concentration and "low" accuracy rate to be higher than that in the case of "high" concentration and "medium" accuracy rate.

If the evaluation of the task execution is high (i.e., if the accuracy rate is "high"), the intervention mode determination unit 17 increases the difficulty of the subsequent task. In this case, the intervention mode determination unit 17 increases the degree of difficulty of the next task with decreasing degree of concentration. If the degree of concentration is low and the evaluation of the task execution is also low (in the case of "low" concentration and "low" accuracy rate, or "low" concentration and "medium" accuracy rate), the intervention mode determination unit 17 prompts a recess or a try again of the same task. Here, the degree of intervention in the case of "low" concentration and "low" accuracy rate is one step higher than that in the case of "low" concentration and "medium" accuracy rate. Thus, for example, the intervention mode determination unit 17 causes the subject to have a recession or try it again in the case of "low" concentration and "low" accuracy rate while it proposes the subject to have a recession or try it again as an option in the case of "low" concentration and "medium" accuracy rate. In the case where the degree of concentration is low and the evaluation of the task execution is low, the intervention mode determination unit 17 firstly prompts a try of the same task again. Thereafter, when the low degree of concentration and the low evaluation of the task execution continue, it may determine the intervention mode of prompting a recession.

Similarly, in the example of FIG. 5B or FIG. 5C, when the degree of arousal is high or the tension level is low (i.e., relaxed) but the evaluation of the task execution is low, the intervention mode determination unit 17 decreases the degree of difficulty of the subsequent task or selects an intervention mode that prompts the review of the task performed immediately before. When the evaluation of the task execution is high (i.e., when the accuracy rate is "high"), the intervention mode determination unit 17 increases the degree of difficulty of the subsequent task. In this case, the intervention mode determination unit 17 increases the degree of difficulty of the subsequent task with decreasing degree of arousal or with increasing tension level. When the degree of arousal is high or the tension level is low and the evaluation of task execution is also low, the intervention mode determination unit 17 prompts a recession or a try of the same task again.

In the examples shown in FIG. 5A to 5C, the estimated value of the state index and the calculated value of the task evaluation index indicated by the task evaluation information were classified into three stages, but not limited thereto, each of them may be classified into two stages, and may be classified into four or more stages.

If the intervention mode determination unit 17 determines the intervention mode based on estimated values of plural state indices, the intervention mode determination unit 17 may select the final intervention mode by majority vote from plural intervention modes determined by the estimated values of the plural state indices or may select the final intervention mode at random from the plural intervention modes determined by the estimated values of plural state indices. In yet another example, a table or the like indicating the correspondence relation between estimated values of the state indices and the intervention mode is stored in advance in the storage device 4, the intervention mode determination unit 17 determines the intervention mode corresponding to the estimated values of the state indices by referring to the table.

A supplementary description will be herein given of an advantage of determining the intervention mode based on estimated values of plural state indices. For example, when the mode of intervention is determined based on an estimated value of a single state index, the state of the subject at the time of task execution is captured from only one aspect, and it is difficult to accurately grasp whether the state of the subject at the time of task execution is suitable for the task execution by only the estimated value of the single state index. For example, when only the degree of arousal is used, the same intervention mode is obtained in both of the case where the subject is not able to concentrate even though the subject is not sleepy and the case where the subject is not sleepy and thus able to concentrate. In view of the above, in some embodiments, the intervention mode determination unit 17 identifies the state of the subject at the time of execution of the task in multilateral manners based on the estimated values of the plural state indices, thereby determining the appropriate intervention mode corresponding to the actual state of the subject.

(6) Display Example

Figure 6:
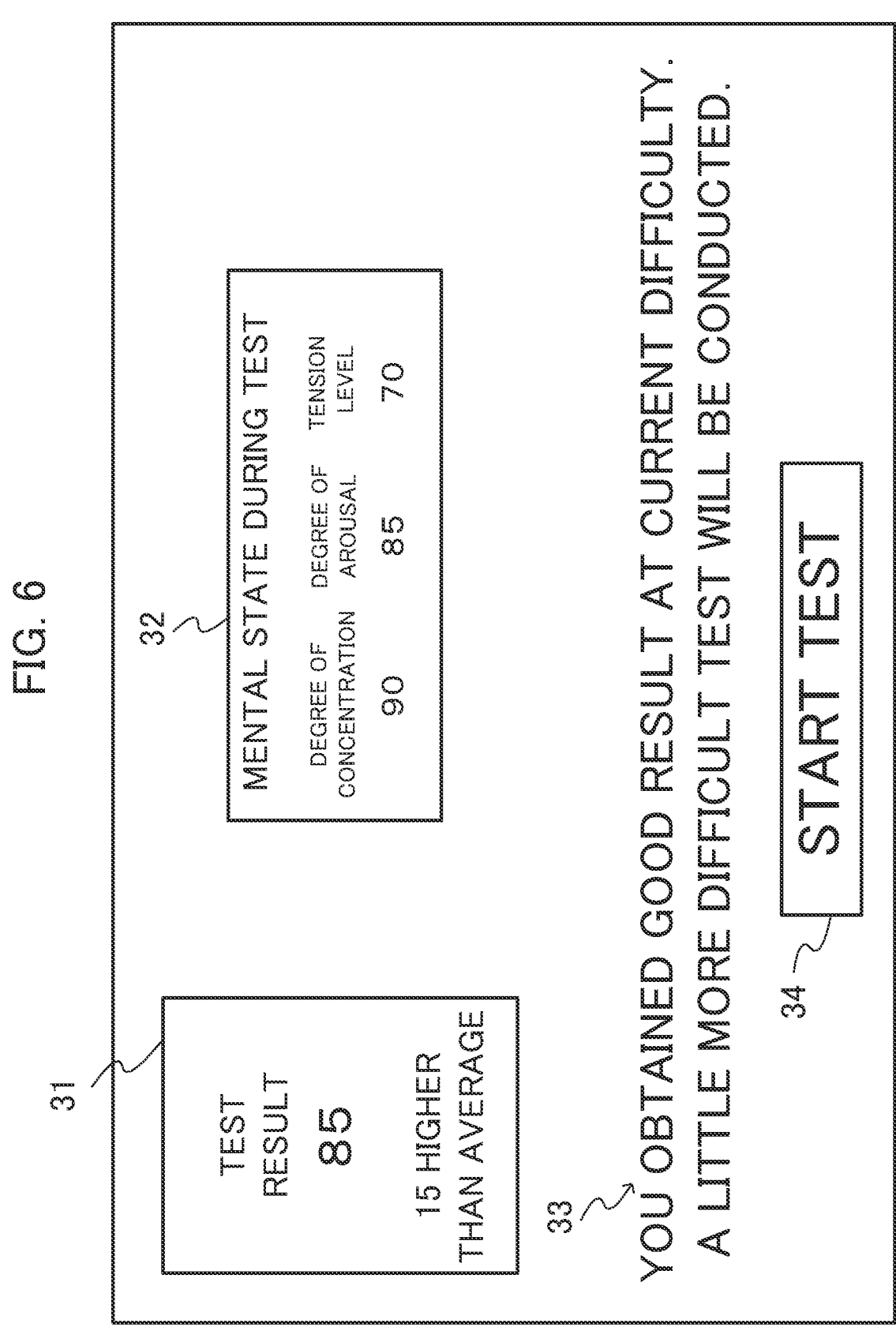
FIG. 6 It shows an example of a display screen image when the task is a test.

FIG. 6 is an example of a display screen image on which the output control unit 18 displays on the output device 3 when a task is a test. After the subject conducted the task, the output control unit 18 generates an output signal S2 based on the intervention mode designation information generated by the intervention mode determination unit 17, and supplies the output signal S2 to the output device 3 via the interface 13, thereby causing the output device 3 to display the display screen image shown in FIG. 6.

The output control unit 18 mainly provides, in the display screen image shown in FIG. 6, a test result display area 31, an estimated state display area 32, a message display area 33, and a test start button 34.

Based on the information received from the task evaluation information acquisition unit 15, the output control unit 18 shows on the test result display area 31 the result (evaluation) of the last test conducted by the subject together with the average score. Based on the information received from the state estimation unit 16, the output control unit 18 displays estimated values of respective state indices (degree of concentration, degree of arousal, and tension level) of the subject during the task execution that are calculated by the state estimation unit 16 on the estimated state display area 32. Here, each estimated value of each state index ranges from 0 to 100.

The output control unit 18 displays a message on the message display area 33 based on the intervention mode designation information generated by the intervention mode determination unit 17. In this case, since the test result is good, it is indicated on the message display area 33 that a subsequent test with an increased degree of difficulty according to the degree corresponding to the state index will be conducted. When it is detected that the test start button 34 is selected based on the user operation performed by the input device 2, the output control unit 18 displays the execution screen image regarding the subsequent test, which is more difficult than the immediately preceding test, on the output device 3. The mode of displaying various numerical values shown in FIG. 6 is just an example. Therefore, for example, the output control unit 18 may present these numerical values as a bar graph, a pie chart or the like so that the degree of the result can be seen at a glance by the user.

In this way, the output control unit 18 can cause the output device to output a display based on the intervention mode determined on the basis of the state of the subject and the evaluation of the test result.

The display example shown in FIG. 6 is an example, and various changes may be made thereto. For example, when the task is training, the reliability computing unit 19 may not provide the estimated state display area 32 in order to cause the subject to dedicate the task.

(7) Processing Flow

Figure 7:
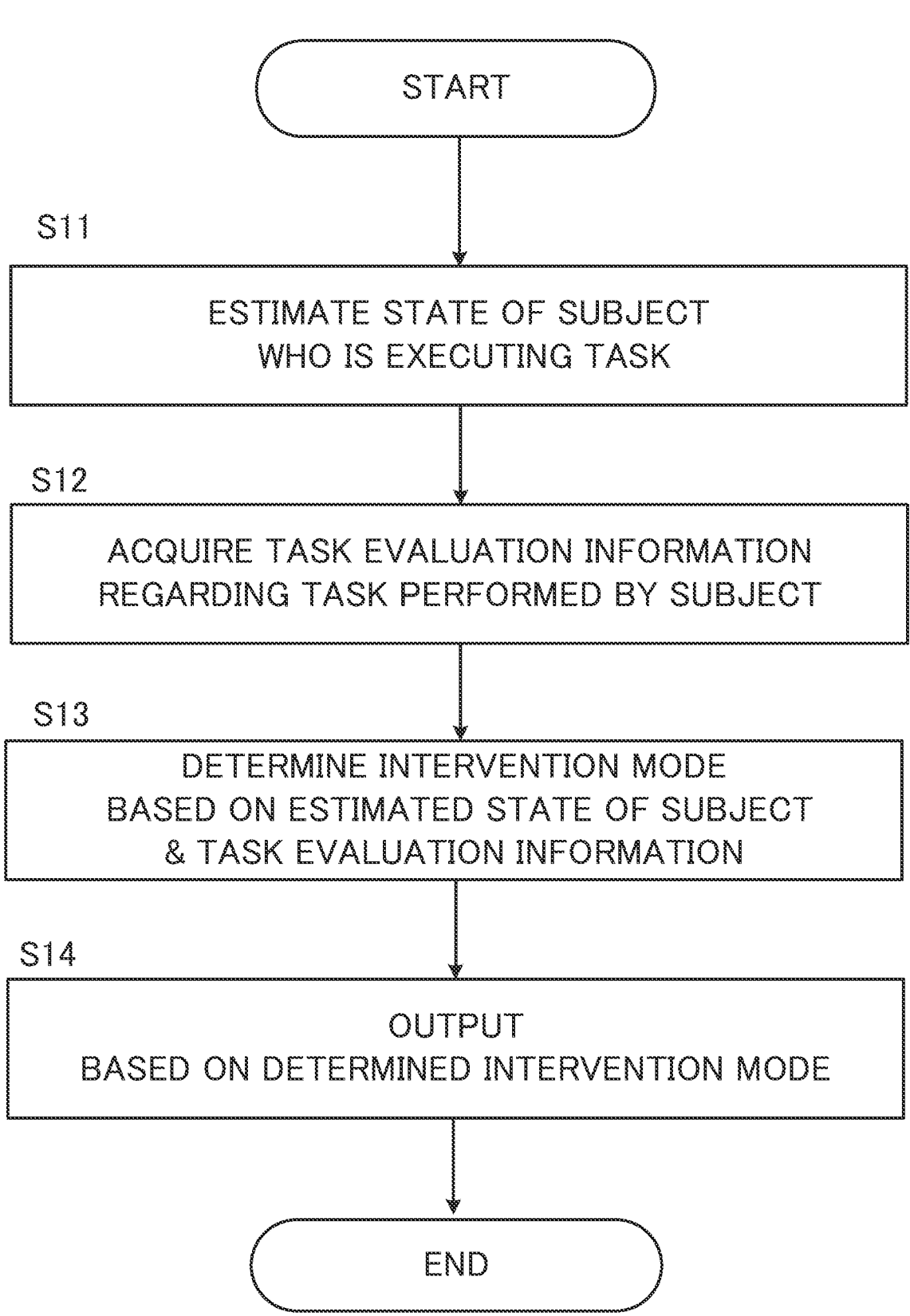
FIG. 7 It shows an example of a flowchart of a processing procedure of the information processing device when the subject executes a task.

FIG. 7 is an example of a flowchart illustrating a processing procedure of an information processing device 1 when a subject executes a task. The information processing device 1, for example, executes the processing of the flowchart when the subject starts to execute the task or when the execution of the task is completed. In the latter case, the information processing device 1 accumulates the observation input signal Ss1 generated by the input device 2 during the task execution period in the memory 12 or the storage device 4, and then executes the process of the flowchart based on the accumulated observation input signal Ss1 after the end of the task.

First, the information processing device 1 estimates the state of a subject who is executing a task (step S11). In this instance, the information processing device 1 may immediately estimate the state of the subject in time series based on observation input signals Ss1 obtained during the task execution period, or may calculate, after the completion of the task, the state of the subject during the task execution period based on the observation input signals Ss1 obtained during the task execution period. In the case where values of the state index of the subject are calculated in time series, the information processing device 1 may set the average or other representative value of the calculated values as the estimated value of the state index to be used for subsequent processing.

Next, the information processing device 1 acquires task evaluation information regarding the task executed by the subject (step S12). In this instance, the information processing device 1 generates the task evaluation information including the calculated value of the evaluation index relating to the execution of the task such as the accuracy rate or the score of the task executed by the subject, based on the user input signal Su1 generated due to the operation by the subject to the input device 2. The operation by the subject in this case may be a gesture recognizable by image analysis, or may be an utterance recognizable by speech signal analysis. It is noted that process at step S11 and the process at step S12 are performed in no particular order and thus the process at step S12 may be performed prior to the process at step S11.

Next, based on the estimated state of the subject and the task evaluation information, the information processing device 1 determines the mode (i.e., the intervention mode) of the approach to the subject (step S13). Then, the information processing device 1 controls the output device 3 and performs output based on the determined intervention mode (step S14). In this instance, the information processing device 1 supplies the output signal S2 to the output device 3 so that the output device 3 performs display or audio output of information (including information for performing the following task) based on the determined intervention mode. Thus, the information processing device 1 can let the subject conduct more effective learning and training depending on the subject while maintaining and improving the learning and training efficiency.

(8) Modifications

A description will be given of a preferred modification to the example embodiment described above. The modifications may be applied to the above example embodiment in any combination.

(First Modification)

The state estimation unit 16 may perform the state estimation of the subject on the basis of observation input signal Ss1 such as a facial image generated by the input device 2 during a predetermined partial period of the task execution period.

In the first example, the information processing device 1 stores the observation input signal Ss1 obtained during the task execution period in the storage device 4 or the like in association with time information indicating the acquisition time. Then, after the completion of the task, the state estimation unit 16 specifies, from the task execution period, a time period (also referred to as "erroneous answer period") in which an erroneous answer by the subject is made, and acquires observation input signals Ss1 such as a facial image corresponding to the specified erroneous answer period from the storage device 4. Then, the state estimation unit 16 calculates an estimated value of the state index representing the estimated state of the subject based on the observation input signals Ss1 during the erroneous answer period. In this case, for example, the task evaluation information acquisition unit 15 stores, in the storage device 4, answer related information which at least indicates the reception time (i.e., response time) of the user input signal Su1 corresponding to an answer of each question in the task and the correctness of the answer. Then, based on the answer related information, the state estimation unit 16 extracts the observation input signals Ss1 acquired during the erroneous answer period from the observation input signals Ss1 acquired during the whole task execution period accumulated in the storage device 4, and calculates an estimated value of the state index based on the extracted observation input signals Ss1. For example, the erroneous answer period is determined to be a time period including the answer time with a predetermined time length. According to the first example, the information processing device 1 can suitably reduce the amount of calculation required for estimating the state of the subject.

In the second example, on the assumption that the state estimation of the subject is performed based on the observation input signals Ss1 generated during a predetermined partial period of the task execution period, the state estimation unit 16 sets the above-mentioned predetermined partial period so that the higher the evaluation of the task execution indicated by the task evaluation information is, the shorter the above-mentioned predetermined partial period becomes. In this case, after the completion of the task, the state estimation unit 16 sets the above-described predetermined partial period to be shorter as the accuracy rate or the score indicated by the task evaluation information calculated by the task evaluation information acquisition unit 15 is higher, and then estimates the state of the subject based on the observation input signals Ss1 acquired during the set predetermined partial period. In this case, the state estimation unit 16 may set a period extracted based on a predetermined rule from the task execution period as the above-described predetermined partial period, or may set a period selected from all or a part of the above-described erroneous answer period as the above-described predetermined partial period.

According to the second example, the information processing device 1 can suitably reduce the calculation amount without reducing the accuracy of the state estimation of the subject.

(Second Modification)

The intervention mode determination unit 17 may determine the current intervention mode in consideration of the result of the past approach performed in the past.

In this case, for example, the storage device 4 preliminarily stores a database of records each of which includes an intervention mode determined in the past, the task evaluation information and the subject state information used in determining the above-mentioned past intervention mode, and the intervention result indicating the result of the past approach based on the above-mentioned intervention mode in association with one another. The intervention result is, for example, information indicative of whether or not the past approach based on the determined intervention has resulted in success and is generated based on a user input signal Su1 (i.e., a user input) provided by the input device 2. The intervention mode determination unit 17 tentatively determines the intervention mode based on the task evaluation information and the subject state information, and retrieves a record which has the same task evaluation information and subject state information as the task evaluation information and subject state information used to tentatively determine the intervention mode. If there is a record which matches the retrieval and the past intervention result of the record indicates failure of the past approach, the intervention mode determination unit 17 lowers the degree of the approach of the tentatively determined intervention mode or defers the execution of the tentatively determined intervention mode. Even in such a case where the intervention mode determination unit 17 defers the execution of the intervention mode, the intervention mode determination unit 17 may execute the deferred intervention mode if the intervention mode determination unit 17 has determined the same intervention mode as the deferred intervention mode for predetermined consecutive times as a result of continuous subsequent execution of the task by the subject.

Thus, it is possible to suitably suppress an immediate determination of the same intervention mode in the same situation when an undesirable result is caused by the past intervention (e.g., an increase in the degree of difficulty of the task). For example, when an unfavorable result is obtained in the past as a result of increasing the degree of difficulty of a task, it is possible to take measures in the same situation to defer immediate increase in the degree of difficulty and then raise the degree of difficulty of a task if it is observed that the accuracy rate is stably high for a predetermined consecutive number of times.

The intervention mode designation information is stored in the storage device 4 after the generation, and may be used for another day. For example, when the execution interval of the task is a predetermined number of days (e.g., one day) interval, the intervention mode determination unit 17 stores the determined intervention mode designation information in the storage device 4. Then, when it becomes the execution timing of the subsequent task, the output control unit 18 determines the degree of difficulty of the task or the like on the basis of the intervention mode designation information stored in the storage device 4 and performs output for the subject to execute the task.

(Third Modification)

The output control unit 18 may notify a person other than the subject of the information based on the intervention mode. In this case, for example, the output control unit 18 may transmit an output signal for displaying the display screen image shown in FIG. 6 to a terminal device used by a person (e.g., instructor, supervisor) other than the subject. In this case, the output control unit 18 may transmit information based on the intervention mode using a communication address such as a mail address owned by the person other than the subject as a destination.

The output control unit 18 may determine the notification destination in accordance with each subject. For example, the storage device 4 stores the user ID of each subject and information associated with the communication address to be the notification destination of information based on the intervention mode, the output control unit 18 transmits information based on the intervention mode to the communication address to be the destination associated with the user ID of the subject. The output control unit 18 may transmit the information based on the intervention mode to the terminal device used by the person other than the subject only if it determines that both the evaluation of task execution and the estimated state of the subject continue to be worse than a predetermined criterion for a predetermined consecutive number of times. In this case, the output control unit 18 outputs the information to the output device 3 to be viewed by the subject as long as it is not determined that both the evaluation of task execution and the estimated state of the subject continue to be worse than the predetermined criterion for the predetermined consecutive number of times.

(Fourth Modification)

The output control unit 18 may perform various displays other than each display element shown in the display screen image in FIG. 6. For example, the output control unit 18 may display averaged information in the age group of the subject.

Figure 8:
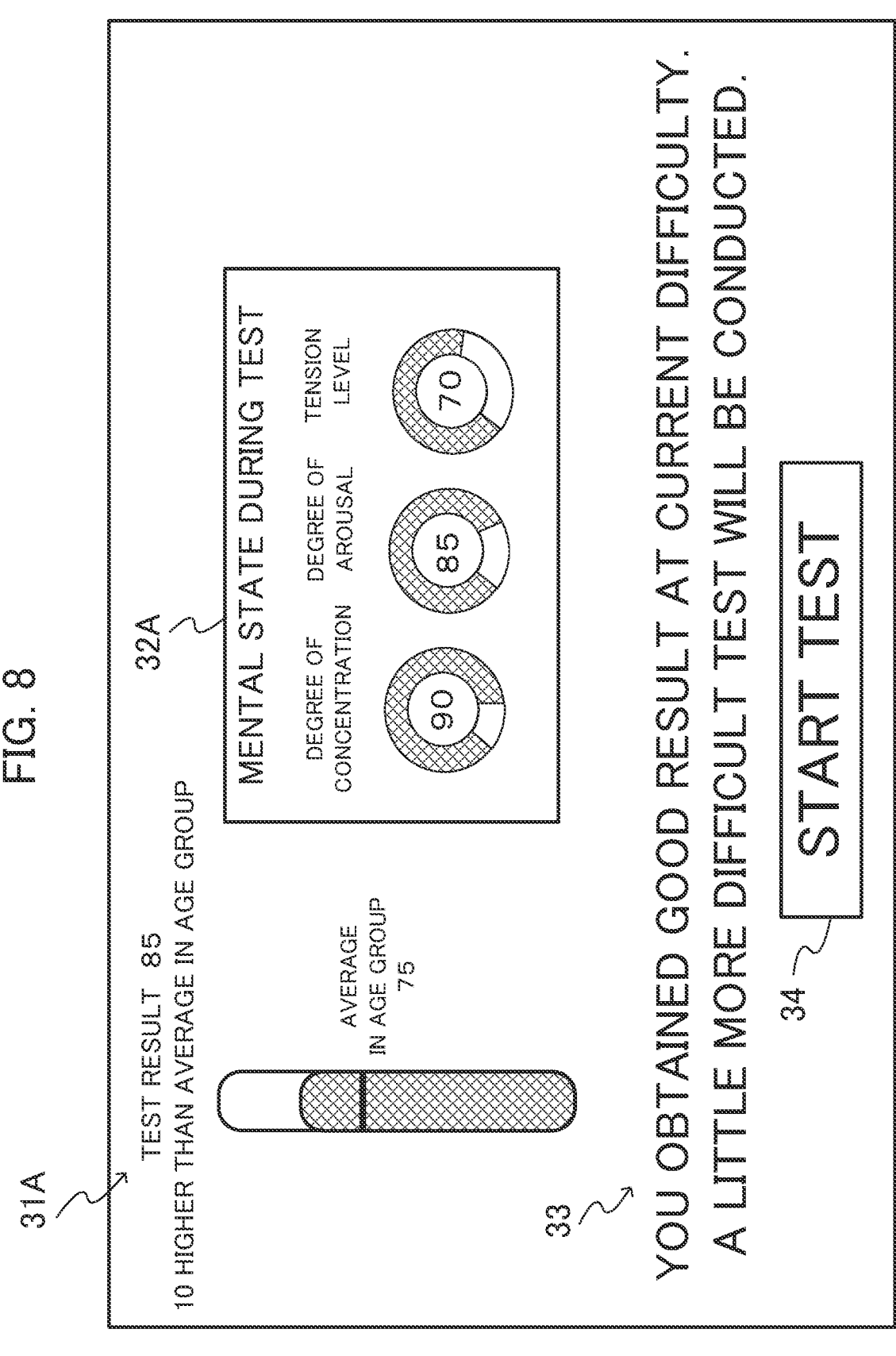
FIG. 8 It shows a display screen image according to a fourth modification.

FIG. 8 shows a display screen image according to a fourth modification. The output control unit 18 includes a test result display area 31A, an estimated state display area 32A, a message display area 33, and a test start button 34 on the display screen image shown in FIG. 8.

Based on the information received from the task evaluation information acquisition unit 15, the output control unit 18 shows the result (evaluation) of the test executed immediately before by the subject on the test result display area 31A together with the average score (75 in this case) of other subjects in the age group to which the subject belongs. The output control unit 18 may further display the distribution of average scores of the other subjects in the age group to which the subject belongs (e.g., the distribution range of the average scores).

Based on the information received from the state estimation unit 16, the output control unit 18 displays the estimated values of the respective state indices (degree of concentration, degree of arousal, and tension level) of the subject during the task execution period calculated by the state estimation unit 16 on the estimated state display area 32A. The output control unit 18 visually displays the estimated value of each state index so that the filled area of a doughnut chart corresponding to the each state index is widened in accordance with the magnitude of the estimated value of the each state index. Further, the output control unit 18 displays a message on the message display area 33 based on the intervention mode designation information generated by the intervention mode determination unit 17. When the output control unit 18 detects that the test start button 34 is selected based on the user operation performed by the input device 2, the output control unit 18 displays the execution screen image of a test, which is more difficult than the preceding test, on the output device 3.

According to this mode, the output control unit 18 can display the test result of the subject in a comparative manner with the average of the age group to which the subject belongs.

In another example, the output control unit 18 may display the result of the approach described in the second modification together with the history of the test results.

Figure 9:
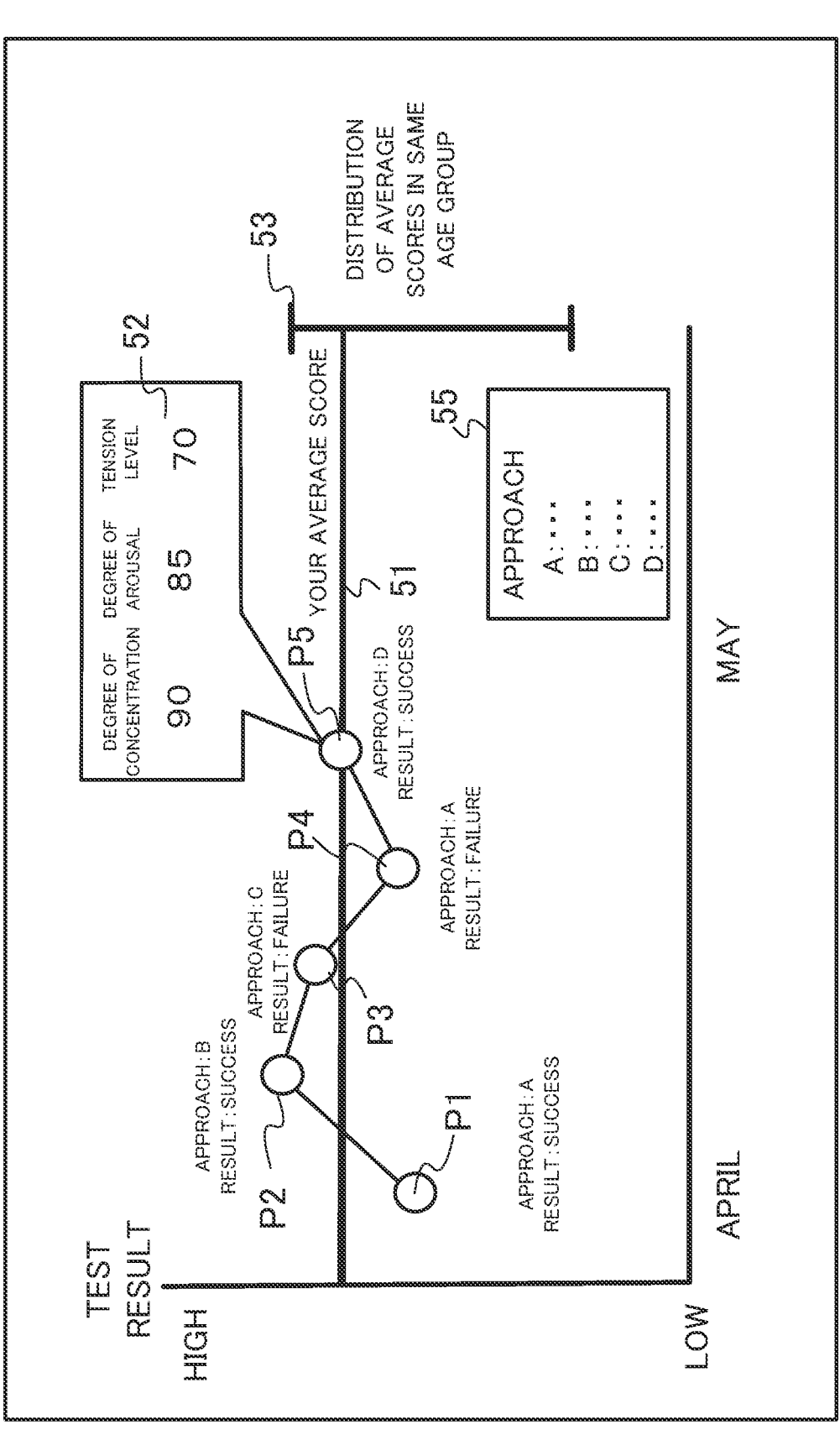
FIG. 9 It shows a second display screen image according to the fourth modification.

FIG. 9 shows a second display screen image according to the fourth modification. The output control unit 18 displays, in the display screen image shown in FIG. 9, a plot diagram obtained by plotting the test results of the subject (test results of the last month, as an example) in time series by using the plot points P1 to P5. The test result may be obtained in units of one day, or may be obtained in any cycle period. The target period of display of the test results on the display screen image may be any time period specified by the user.

In this case, the output control unit 18 displays the average score line 51 indicating the average score of the test results of previous tests conducted by the subject indicated by the plot points P1 to P5, and the distribution range line 52 indicating the distribution (in this case, the range of distribution of the average values) of the average scores of the test results of other subjects who belong to the same age group as the subject. In some embodiments, the output control unit 18 may display, in addition to the distribution range line 52, or in place of this, two distributions of the average scores of the other subjects which belong to the same age group as the subject, respectively, wherein one distribution is for subjects whose specific state index (e.g., degree of concentration) is equal to or larger than a predetermined criterion and the other distribution is for subjects whose specific state index is smaller than the predetermined criterion. Further, the output control unit 18 provides, at the plot point P5 which is selected by the user, the blowout 52 indicating the estimated value of each state index at the time of the test execution.

Furthermore, for each of the plot points P1 to P5 corresponding to the past tests conducted just after the approach based on the determined intervention mode, the output control unit 18 displays a set of the intervention mode and the corresponding intervention result, by referring to the database described in the second modification. Here, symbols A to D into which the intervention modes are classified are explicitly shown as an example of identification information of the intervention mode, and success or failure is explicitly shown as an example of an intervention result. The output control unit 18 displays the specific details of the intervention modes corresponding to the symbols A to D on the window 55.

According to this mode, the output control unit 18 can suitably present to the user a history of the test results and a history of the results of the approach.

Second Example Embodiment

The information processing device 1 according to the second example embodiment is different from the information processing device 1 according to the first example embodiment in that the information processing device 1 according to the second example embodiment further calculates the degree of reliability (also referred to as "evaluation reliability degree") for an evaluation regarding task execution and outputs the evaluation reliability degree. Hereinafter, the same components as those in the first example embodiment are appropriately denoted by the same reference numerals, and a description thereof will be omitted. The configuration of the task evaluation/intervention system 100 according to the second example embodiment is the same as the configuration shown in FIG. 1, and the hardware configuration of the information processing device 1 according to the second example embodiment is the same as the configuration shown in FIG. 2.

Figure 10:
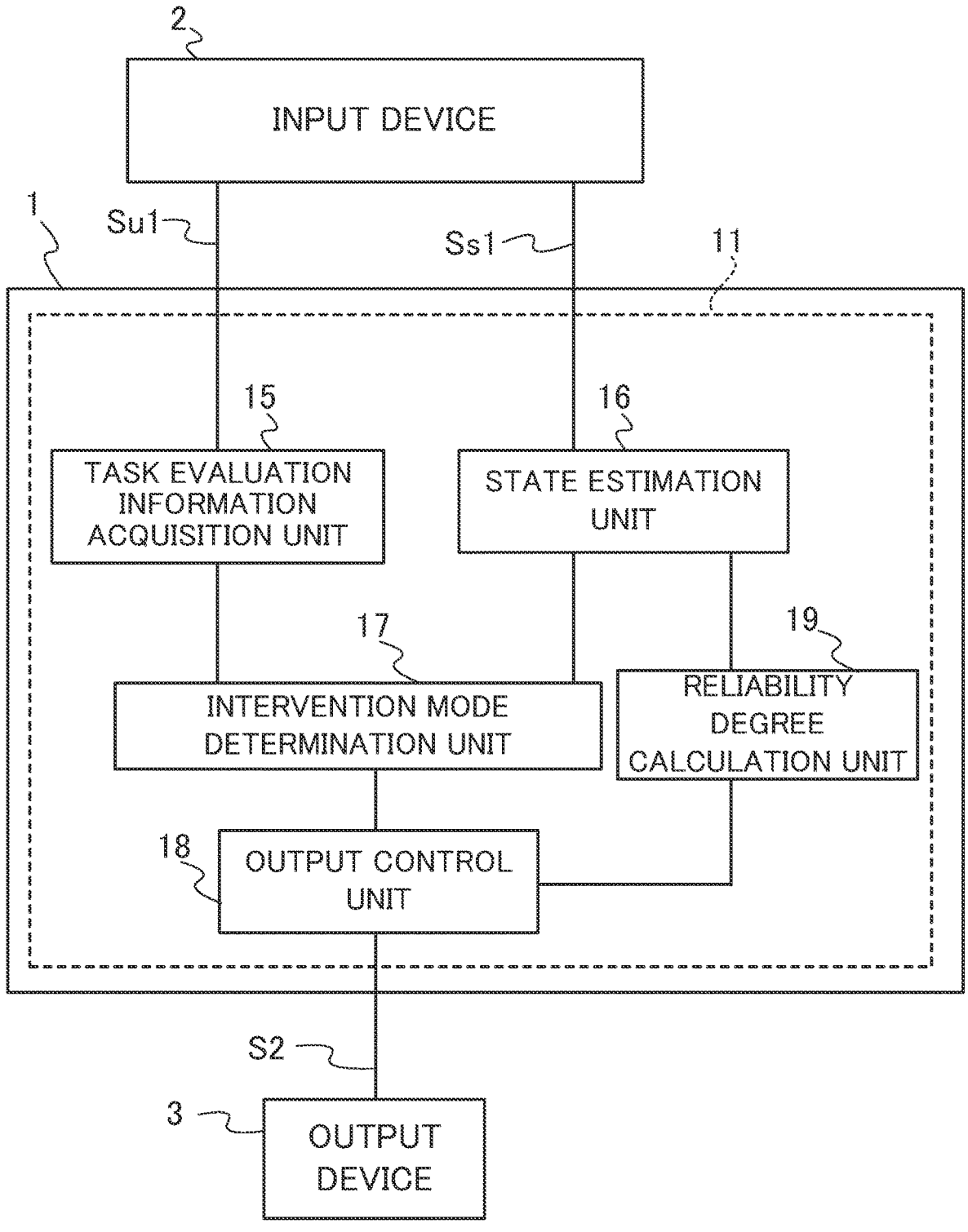
FIG. 10 It is an example of a functional block diagram of the information processing device in a second example embodiment.

FIG. 10 is an example of a functional block diagram of the processor 11 of the information processing device 1 according to the second example embodiment. The processor 11 functionally includes a task evaluation information acquisition unit 15, a state estimation unit 16, an intervention mode determination unit 17, an output control unit 18, and a reliability degree calculation unit 19. Since the processes to be executed by the task evaluation information acquisition unit 15, the state estimation unit 16, and the intervention mode determination unit 17 are the same as those described in FIG. 3, the description thereof will not be repeated.

The reliability degree calculation unit 19 calculates the evaluation reliability degree based on the subject state information outputted by the state estimation unit 16. In this case, for example, the storage device 4 stores in advance a table or an equation which indicates a correspondence between each assumed value of one or more state indices to be used for calculation of the evaluation reliability degree and the evaluation reliability degree to be set for the each assumed value. The reliability degree calculation unit 19 calculates the evaluation reliability degree based on the estimated value of each state index indicated by the subject state information and the above-described table or equation. Specific examples of calculation of the evaluation reliability degree by the reliability degree calculation unit 19 will be described later. Then, the reliability degree calculation unit 19 supplies information regarding the calculated evaluation reliability degree to the output control unit 18.

The output control unit 18 controls the output by the output device 3 based on the intervention mode designation information supplied from the intervention mode determination unit 17 and the information regarding the evaluation reliability degree supplied from the reliability degree calculation unit 19. Specific examples of the output by the output device 3 will be described later.

FIG. 11A is a table showing a correspondence relation among: the accuracy rate, which is an example of an evaluation index relating to task execution; the degree of arousal, which is an example of the state index; and a corresponding score (also referred to as "reliability score") of the evaluation reliability degree. The reliability score is herein assumed to range from 1 to 10, and 10 is the highest evaluation reliability degree. As shown in FIG. 11A, the reliability degree calculation unit 19 determines the reliability score, regardless of the evaluation (in this case, accuracy rate) of the task execution by the subject, based on the state index (in this case, degree of arousal) of the subject. Specifically, the reliability degree calculation unit 19 sets the reliability score to increase with increasing degree of arousal. In the case of using the degree of concentration as the state index, the reliability degree calculation unit 19 sets the reliability score to increase with increasing degree of concentration. In the case of using the tension level as the state index, the reliability degree calculation unit 19 sets the reliability score to increase with decreasing tension level. As described above, the reliability degree calculation unit 19 sets the reliability score to increase with an increase in the degree of suitability of the state of the subject for execution of the task. In the example shown in FIG. 11A, although the value of the state index was classified into three stages, it is not limited to this and the value may be classified into two stages, and may be classified into four or more stages.

The reliability calculation unit 19 may determine the reliability score based on a plurality of state indices. FIG. 11B is a table showing the correspondence relation among the degree of arousal and the degree of concentration and the corresponding reliability score. As shown in FIG. 11B, in this case, on the assumption that the degree of concentration is fixed, the higher the degree of arousal is, the higher the reliability score becomes. On the assumption that the degree of arousal is fixed, the higher the degree of concentration is, the higher the reliability score becomes. Thus, by referring to the table indicating the correspondence between each value or level of plural state indices and the reliability score, the reliability degree calculation unit 19 can suitably determine the reliability score from a plurality of state indices.

Figure 12:
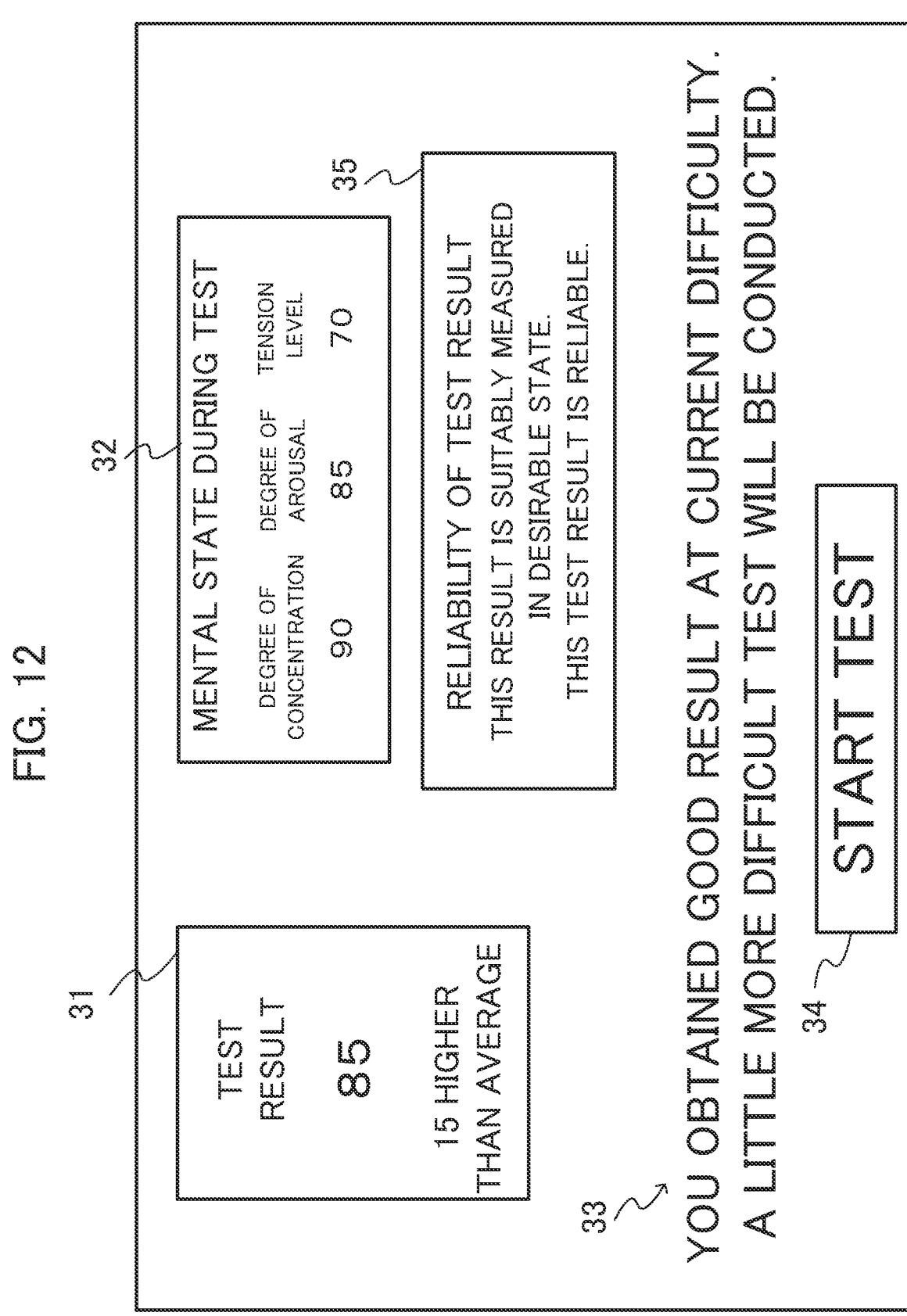
FIG. 12 It is an example of a display screen image in the second example embodiment.

FIG. 12 is an example of a display screen image to be displayed on the output device 3 by the output control unit 18 in the second example embodiment. After the subject conducts a task (test in this case), the output control unit 18 generates an output signal S2 based on the intervention mode designation information and information regarding the evaluation reliability degree. Then, by supplying the output signal S2 to the output device 3 via the interface 13, the output device 3 causes the output device 3 to display the display screen image shown in FIG. 12.

The output control unit 18 mainly provides, in the display screen image shown in FIG. 12, a test result display area 31, an estimated state display area 32, a message display area 33, a test start button 34, the evaluation reliability degree display area 35. Since the test result display area 31, the estimated state display area 32, the message display area 33, and the test start button 34 are the same as the areas in the display screen image shown in FIG. 6, the description thereof will be omitted.

The output control unit 18 displays, on the evaluation reliability degree display area 35, a message based on the evaluation reliability degree. In this example, since the reliability score indicating the evaluation reliability degree is higher than a predetermined threshold value, the output control unit 18 displays a message indicating that the evaluation (test result in this case) shown in the test result display area 31 is reliable. The output control unit 18 may further display, on the evaluation reliability display area 35, the reliability score in addition to the message described above.

According to the display screen image, the output control unit 18 can suitably notify the user of the degree of reliability for evaluation of task execution.

Third Example Embodiment

Figure 13:
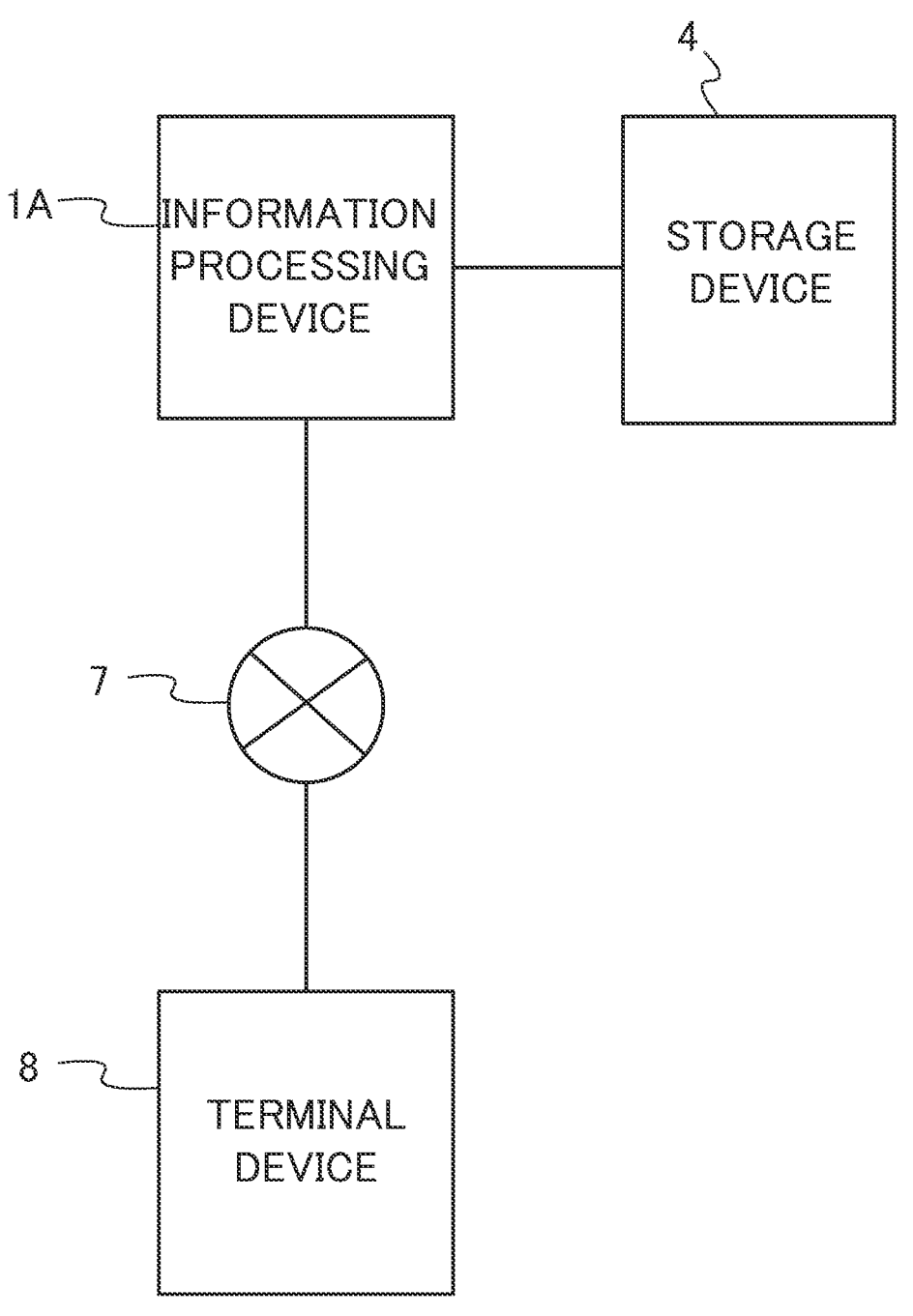
FIG. 13 It shows a schematic configuration of a task evaluation/intervention system in a third example embodiment.

FIG. 13 shows a schematic configuration of a task evaluation/intervention system 100A according to a third example embodiment. The task evaluation/intervention system 100A according to the third example embodiment is a server-client model system, and the information processing device 1A functioning as a server device performs the same process as the information processing device 1 according to the first example embodiment. Hereinafter, the same components as those in the first example embodiment are appropriately denoted by the same reference numerals, and a description thereof will be omitted.

The task evaluation/intervention system 100A mainly includes an information processing device 1A that functions as a server, a storage device 4 that stores the same data as the storage device 4 in the first example embodiment, and a terminal device 8 that functions as a client. The information processing device 1A and the terminal device 8 perform data communication with each other via the network 7.

The terminal device 8 is a terminal equipped with an input function, a display function, and a communication function, and functions as the input device 2 and the output device 3 shown in FIG. 1. Examples of the terminal device 8 include a personal computer, a tablet-type terminal, and a PDA (Personal Digital Assistant). The terminal device 8 transmits data, such as a biological signal outputted by sensor (not shown) and an input signal based on a user input, to the information processing device 1A.

The information processing device 1A is equipped with the same hardware configuration and function configuration as the information processing device 1, for example. Then, the information processing device 1A receives, from the terminal device 8 via the network 7, the same information as the information acquired from the input device 2 by the information processing device 1 illustrated in FIG. 1, and generates subject state information, task evaluation information, intervention mode designation information, and the like based on the received information. The information processing device 1A transmits an output signal indicating information based on the intervention mode indicated by the intervention mode designation information to the terminal device 8 via the network 7. Namely, in this case, the terminal device 8 functions as the output device 3 in the first example embodiment or the second example embodiment. Thus, the information processing device 1A suitably presents the information based on the determined intervention mode to the user of the terminal device 8.

Fourth Example Embodiment

Figure 14:
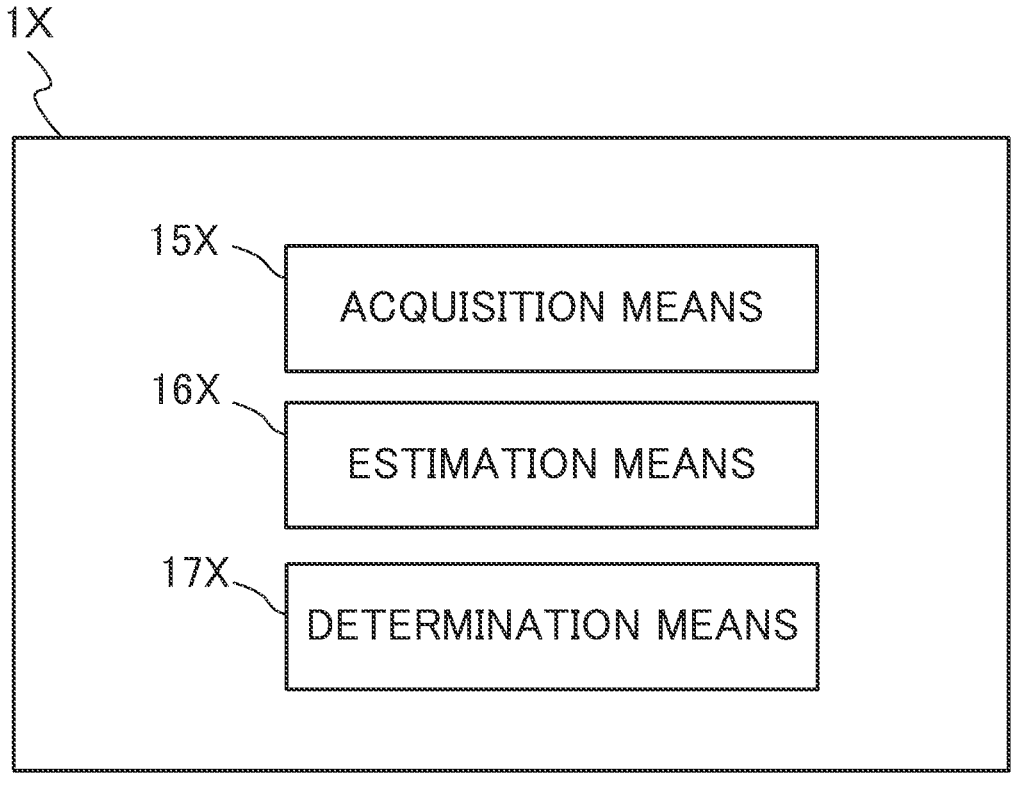
FIG. 14 It is a block diagram of an information processing device according to a fourth example embodiment.

FIG. 14 is a block diagram of an information processing device 1X according to a fourth example embodiment. The information processing device 1X mainly includes an acquisition means 15X, an estimation means 16X, and a determination means 17X. The information processing device 1X may be configured by a plurality of devices. Examples of the information processing device 1X include the information processing device 1 according to the first example embodiment (including the modifications, and the same hereinafter) and the information processing device 1A according to the second example embodiment or the third example embodiment.

The acquisition means 15X is configured to acquire task evaluation information relating to evaluation of execution of a task executed by a subject. The term "evaluation" herein indicates an evaluation for the task execution (in detail, the execution result of the task), and if the task includes one or more questions, it indicates an evaluation (e.g., accuracy rate) on the correctness of the answers by the subject to the questions. Examples of the acquisition means 15X include the task evaluation information acquisition unit 15 according to the first example embodiment to the third example embodiment.

The estimation means 16X is configured to estimate a state of the subject in execution of the task. The "state of the subject in execution of the task" may be the state of the subject during a part of the whole execution period of the task. Examples of the estimation means 16X include the state estimation unit 16 according to the first example embodiment to third example embodiment.

The determination means 17X is configured to determine a mode of an approach to the subject based on the task evaluation information and the state of the subject. Examples of the determination means 17X include the intervention mode determination unit 17 according to the first example embodiment to the third example embodiment.

Figure 15:
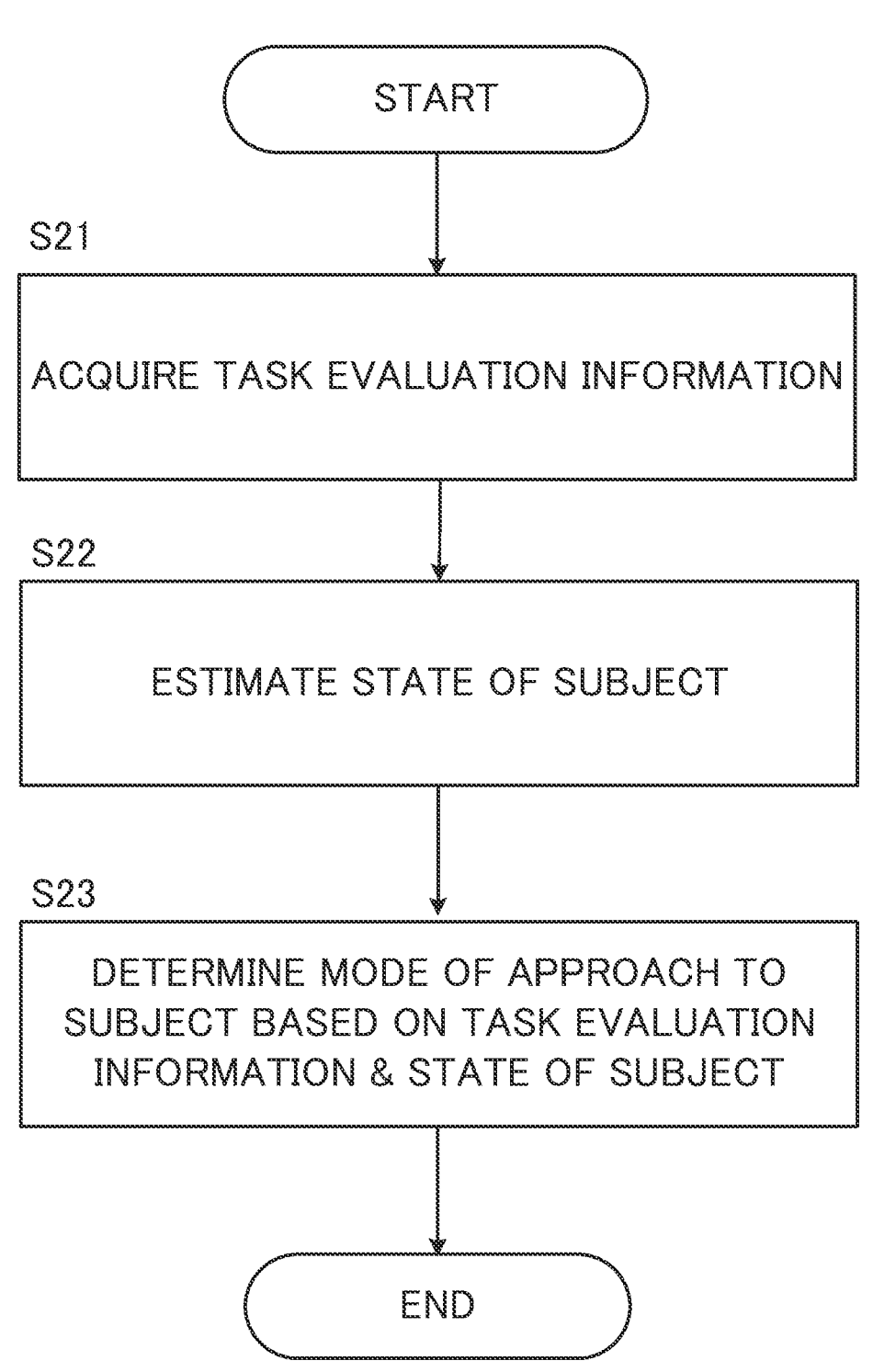
FIG. 15 It is an example of a flowchart executed by an information processing device in the fourth example embodiment.

FIG. 15 is an exemplary flowchart that is executed by the information processing device 1X in the fourth example embodiment. The acquisition means 15X acquires task evaluation information relating to evaluation of execution of a task executed by a subject (step S21). The estimation means 16X estimates a state of the subject in execution of the task (step S22). The determination means 17X determines a mode of an approach to the subject based on the task evaluation information and the state of the subject (step S23).

According to the fourth example embodiment, the information processing device 1X can suitably determine the mode of the approach to the subject.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]

An information processing device comprising:

an acquisition means configured to acquire task evaluation information relating to evaluation of execution of a task executed by a subject;

an estimation means configured to estimate a state of the subject in execution of the task; and a determination means configured to determine a mode of an approach to the subject based on the task evaluation information and the estimated state of the subject.

[Supplementary Note 2]

The information processing device according to Supplementary Note 1, wherein the estimation means is configured to estimate the state of the subject based on a facial image of the subject captured by a visible light camera.

[Supplementary Note 3]

The information processing device according to Supplementary Note 1, wherein the evaluation is an evaluation relating to correctness of an answer by the subject to a question included in the task.

[Supplementary Note 4]

The information processing device according to Supplementary Note 3,

wherein the estimation means is configured to estimate the state of the subject based on information obtained by observing the subject in a time period of the answer that becomes an error.

[Supplementary Note 5]

The information processing device according to Supplementary Note 3, wherein the estimation means is configured to estimate the state of the subject based on information obtained by observing the subject in a predetermined time period in execution of the task, and wherein the estimation means is configured to set the predetermined time period so that the higher the evaluation is, the shorter the predetermined time period becomes.

[Supplementary Note 6]

The information processing device according to any one of Supplementary Notes 1 to 5, wherein the determination means is configured to determine the mode of a current approach based on the task evaluation information, the estimated state of the subject, and the mode of a past approach determined in the past and the result of the past approach.

[Supplementary Note 7]

The information processing device according to any one of Supplementary Notes 1 to 5, further comprising an output control means configured to output information based on the mode of the approach.

[Supplementary Note 8]

The information processing device according to Supplementary Note 7, wherein the output control means is configured to output information based on the mode of the approach, and information regarding a degree of reliability of the evaluation calculated based on the estimated state of the subject.

[Supplementary Note 9]

The information processing device according to any one of Supplementary Notes 1 to 5, wherein the determination means is configured to determine the mode of the approach regarding a subsequent task to be worked on by the subject.

[Supplementary Note 10]

The information processing device according to any one of Supplementary Notes 1 to 5, wherein the determination means is configured to determine the mode of the approach relating to a change in a state of a mind and body of the subject.

[Supplementary Note 11]

A determination method executed by a computer, the determination method comprising:

acquiring task evaluation information relating to evaluation of execution of a task executed by a subject;

estimating a state of the subject in execution of the task; and determining a mode of an approach to the subject based on the task evaluation information and the estimated state of the subject.

[Supplementary Note 12]

A storage medium a program executed by a computer, the program causing the computer to acquire task evaluation information relating to evaluation of execution of a task executed by a subject;

estimate a state of the subject in execution of the task; and

determine a mode of an approach to the subject based on the task evaluation information and the estimated state of the subject.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

INDUSTRIAL APPLICABILITY

Examples of the applications include a service related to a self-learning and a self-training.

DESCRIPTION OF REFERENCE NUMERALS

1, 1A, 1X Information processing device
2 Input device
3 Output device
4 Storage device
8 Terminal device
100, 100A Task evaluation/intervention system

What is claimed is:

1. An information processing device comprising:
at least one memory configured to store instructions; and
at least one processor configured to execute the instructions to:
    acquire facial images of a subject captured by a visible light camera;
    acquire task evaluation information relating to an evaluation of an execution of a task executed by the subject and based on processing facial images of the subject by at least one trained machine-learning model;
    identify, from the acquired facial images, a facial image captured during time period when an erroneous answer was provided by the subject in the task;
    determine whether to adjust a predetermined time period depending on the evaluation, and determining whether to adjust the predetermined time period depending on the evaluation comprises determining to shorten the predetermined time period based on the evaluation being determined to represent a first level that is higher than a second level;
    shorten the predetermined time period based on the evaluation being determined to represent a first level that is higher than a second level;
    estimate a state of the subject in the execution of the task based on the identified facial image; and
    determine a mode of an approach to the subject based on the task evaluation information and the estimated state of the subject.

2. The information processing device according to claim 1,
wherein the at least one processor is further configured to execute the instructions to:
    identify, based on reception time when signal information indicating that the subject provided each answer to each question in the task was received, and the correctness of each the answer, erroneous answer period when an incorrect answer was provided by the subject; and
    identify the facial image corresponding to the erroneous answer period.

3. The information processing device according to claim 1,
wherein the at least one processor is further configured to execute the instructions to determine the mode of a current approach based on:
    the task evaluation information,
    the estimated state of the subject, and
    the mode of a past approach determined in the past and the result of the past approach.

4. The information processing device according to claim 1,
wherein the at least one processor is further configured to further execute the instructions to output information based on the mode of the approach.

5. The information processing device according to claim 4,
wherein the at least one processor is further configured to execute the instructions to output
    information based on the mode of the approach, and
    information regarding a reliability score of the evaluation, the score of the evaluation being based on an index representing the estimated state of the subject.

6. The information processing device according to claim 1,
wherein the at least one processor is further configured to execute the instructions to determine the mode of the approach regarding a subsequent task to be worked on by the subject.

7. The information processing device according to claim 1,
wherein the at least one processor is further configured to execute the instructions to determine the mode of the approach relating to a change in a state of a mind and body of the subject.

8. The information processing device according to claim 1,
wherein the at least one processor is further configured to execute the instructions to estimate the state of the subject based on the machine-learning model and an observation signal generated by a sensor which senses the subject, and
wherein the machine-learning model is trained by machine learning to output an estimation value of a state index representing the state of the subject in response to an input of the observation signal thereto.

9. The information processing device according to claim 1,
wherein the at least one processor is further configured to execute the instructions to determine at least one of an optimized degree of difficulty and/or an optimized execution timing of a subsequent task to be worked on by the subject.

10. A determination method executed by a computer, the determination method comprising:
    acquiring facial images of a subject captured by a visible light camera;
    acquiring task evaluation information relating to an evaluation of an execution of a task executed by the subject and based on processing facial images of the subject by at least one trained machine-learning model;

identifying, from the acquired facial images, a facial image captured during time period when an erroneous answer was provided by the subject in the task;

determining whether to adjust a predetermined time period depending on the evaluation, and determining whether to adjust the predetermined time period depending on the evaluation comprises determining to shorten the predetermined time period based on the evaluation being determined to represent a first level that is higher than a second level;

shortening the predetermined time period based on the evaluation being determined to represent a first level that is higher than a second level;

estimating a state of the subject in the execution of the task based on the identified facial image; and determining a mode of an approach to the subject based on the task evaluation information and the estimated state of the subject.

11. A non-transitory computer readable storage medium storing a program executed by a computer, the program causing the computer to implement:

acquiring facial images of a subject captured by a visible light camera;

acquiring task evaluation information relating to an evaluation of an execution of a task executed by the subject and based on processing facial images of the subject by at least one trained machine-learning model;

identifying, from the acquired facial images, a facial image captured during time period when an erroneous answer was provided by the subject in the task;

determining whether to adjust a predetermined time period depending on the evaluation, and determining whether to adjust the predetermined time period depending on the evaluation comprises determining to shorten the predetermined time period based on the evaluation being determined to represent a first level that is higher than a second level;

shortening the predetermined time period based on the evaluation being determined to represent a first level that is higher than a second level;

estimating a state of the subject in the execution of the task based on the identified facial image; and determining a mode of an approach to the subject based on the task evaluation information and the estimated state of the subject.

*    *    *    *    *